US008484295B2

(12) United States Patent
Chasin et al.

(10) Patent No.: US 8,484,295 B2
(45) Date of Patent: Jul. 9, 2013

(54) SUBSCRIBER REPUTATION FILTERING METHOD FOR ANALYZING SUBSCRIBER ACTIVITY AND DETECTING ACCOUNT MISUSE

(75) Inventors: C. Scott Chasin, Denver, CO (US); Wei Lin, Norcross, GA (US); Paul Kincaid-Smith, Lakewood, CO (US)

(73) Assignee: McAfee, Inc., Santa Clara, CA (US)

( * ) Notice: Subject to any disclaimer, the term of this patent is extended or adjusted under 35 U.S.C. 154(b) by 1144 days.

(21) Appl. No.: 11/315,480

(22) Filed: Dec. 21, 2005

(65) Prior Publication Data

US 2013/0041955 A1 Feb. 14, 2013

Related U.S. Application Data

(60) Provisional application No. 60/638,208, filed on Dec. 21, 2004, provisional application No. 60/693,927, filed on Jun. 23, 2005.

(51) Int. Cl.
*G06F 15/16* (2006.01)
*G06F 15/173* (2006.01)

(52) U.S. Cl.
USPC ............ 709/206; 709/207; 709/223; 709/228

(58) Field of Classification Search
USPC ........................................................ 709/206
See application file for complete search history.

(56) References Cited

U.S. PATENT DOCUMENTS

| | | | |
|---|---|---|---|
| 5,627,764 A | 5/1997 | Schutzman et al. | |
| 5,790,790 A | 8/1998 | Smith et al. | |
| 5,884,033 A | 3/1999 | Duvall et al. | |
| 5,937,161 A | 8/1999 | Mulligan et al. | |
| 5,937,162 A | 8/1999 | Funk et al. | |
| 5,987,610 A | 11/1999 | Franczek et al. | |
| 6,003,027 A | 12/1999 | Prager | |
| 6,052,709 A | 4/2000 | Paul | |
| 6,061,448 A | 5/2000 | Smith et al. | |
| 6,073,142 A | 6/2000 | Geiger et al. | |

(Continued)

FOREIGN PATENT DOCUMENTS

| | | |
|---|---|---|
| EP | 1949240 | 7/2008 |
| JP | 2001-265674 | 9/2001 |
| JP | 2004-287790 | 10/2004 |
| JP | 2009515426 | 4/2009 |
| WO | WO 2005/006139 | 1/2005 |
| WO | WO 2005/010692 | 2/2005 |
| WO | WO 2007/055770 | 5/2007 |

OTHER PUBLICATIONS

Corporate Factsheet 2005, Clearswift Ltd., downloaded Nov. 6, 2005 (12 pages).

(Continued)

*Primary Examiner* — Richard G Keehn
(74) *Attorney, Agent, or Firm* — Patent Capital Group

(57) ABSTRACT

Systems and methods are provided for allowing subscriber message sending profiles to be maintained and used in conjunction with behavior-based anomaly detection techniques and traditional content-based spam signature filtering to enable application of appropriate message disposition policies to outbound subscriber message traffic. According to one embodiment, subscriber profiles are constructed for multiple subscriber accounts associated with a service provider based on outbound message flow originated from the subscriber accounts. Then, possible subscriber account misuse may be discovered by performing behavior-based anomaly detection, including a comparison of a subscriber profile associated with the subscriber account with recent subscriber account usage information, to identify one or more behavioral anomalies in outbound message flow originated from a subscriber account, the behavior-based anomaly detection.

12 Claims, 22 Drawing Sheets

U.S. PATENT DOCUMENTS

| | | |
|---|---|---|
| 6,119,137 A | 9/2000 | Smith et al. |
| 6,141,686 A | 10/2000 | Jackowski et al. |
| 6,151,675 A | 11/2000 | Smith |
| 6,161,130 A | 12/2000 | Horvitz et al. |
| 6,192,360 B1 | 2/2001 | Dumais et al. |
| 6,192,407 B1 | 2/2001 | Smith et al. |
| 6,249,805 B1 | 6/2001 | Fleming, III |
| 6,266,692 B1 | 7/2001 | Greenstein |
| 6,321,267 B1 | 11/2001 | Donaldson |
| 6,381,634 B1 | 4/2002 | Tello et al. |
| 6,385,655 B1 | 5/2002 | Smith et al. |
| 6,389,455 B1 | 5/2002 | Fuisz |
| 6,393,465 B2 | 5/2002 | Leeds |
| 6,400,810 B1 | 6/2002 | Skladman et al. |
| 6,421,709 B1 | 7/2002 | McCormick et al. |
| 6,438,583 B1 | 8/2002 | McDowell et al. |
| 6,460,050 B1 | 10/2002 | Pace et al. |
| 6,470,086 B1 | 10/2002 | Smith |
| 6,487,599 B1 | 11/2002 | Smith et al. |
| 6,493,007 B1 | 12/2002 | Pang |
| 6,507,866 B1 | 1/2003 | Barchi |
| 6,529,956 B1 | 3/2003 | Smith et al. |
| 6,546,416 B1 | 4/2003 | Kirsch |
| 6,587,549 B1 | 7/2003 | Weik |
| 6,609,196 B1 | 8/2003 | Dickinson, III et al. |
| 6,615,241 B1 | 9/2003 | Miller et al. |
| 6,615,242 B1 | 9/2003 | Riemers |
| 6,618,747 B1 | 9/2003 | Flynn et al. |
| 6,643,686 B1 | 11/2003 | Hall |
| 6,643,687 B1 | 11/2003 | Dickie et al. |
| 6,643,688 B1 | 11/2003 | Fuisz |
| 6,650,890 B1 | 11/2003 | Irlam et al. |
| 6,651,166 B1 | 11/2003 | Smith et al. |
| 6,654,787 B1 | 11/2003 | Aronson et al. |
| 6,711,615 B2 | 3/2004 | Porras et al. |
| 6,725,381 B1 | 4/2004 | Smith et al. |
| 6,732,101 B1 | 5/2004 | Cook |
| 6,732,157 B1 | 5/2004 | Gordon et al. |
| 6,748,529 B2 | 6/2004 | Smith |
| 6,757,830 B1 | 6/2004 | Tarbotton et al. |
| 6,769,016 B2 | 7/2004 | Rothwell et al. |
| 6,772,196 B1 | 8/2004 | Kirsch et al. |
| 6,802,012 B1 | 10/2004 | Smithson et al. |
| 6,826,609 B1 | 11/2004 | Smith et al. |
| 6,829,635 B1 | 12/2004 | Townshend |
| 6,842,773 B1 | 1/2005 | Ralston et al. |
| 6,850,602 B1 | 2/2005 | Chou |
| 6,868,498 B1 | 3/2005 | Katsikas |
| 6,901,509 B1 | 5/2005 | Kocher |
| 6,907,571 B2 | 6/2005 | Slotznick |
| 6,912,285 B2 | 6/2005 | Jevans |
| 6,941,348 B2 | 9/2005 | Petry et al. |
| 6,944,616 B2 | 9/2005 | Ferguson et al. |
| 6,963,929 B1 | 11/2005 | Lee |
| 7,016,939 B1 | 3/2006 | Rothwell et al. |
| 7,020,642 B2 | 3/2006 | Ferguson et al. |
| 7,051,077 B2 | 5/2006 | Lin |
| 7,062,498 B2 | 6/2006 | Al-Kofahi et al. |
| 7,072,942 B1 | 7/2006 | Maller |
| 7,089,241 B1 | 8/2006 | Alspector et al. |
| 7,107,254 B1 | 9/2006 | Dumais et al. |
| 7,145,875 B2* | 12/2006 | Allison et al. ............. 370/230.1 |
| 7,178,030 B2 | 2/2007 | Scheidt et al. |
| 7,181,764 B2 | 2/2007 | Zhu et al. |
| 7,219,148 B2 | 5/2007 | Rounthwaite et al. |
| 7,266,508 B1 | 9/2007 | Owen et al. |
| 7,320,020 B2 | 1/2008 | Chadwick et al. |
| 7,401,148 B2* | 7/2008 | Lewis ........................... 709/228 |
| 7,472,422 B1* | 12/2008 | Agbabian ....................... 726/25 |
| 7,506,155 B1 | 3/2009 | Stewart et al. |
| 7,596,600 B2 | 9/2009 | Quine et al. |
| 7,657,935 B2 | 2/2010 | Stolfo et al. |
| 7,680,890 B1 | 3/2010 | Lin |
| 7,870,240 B1* | 1/2011 | Horvitz ........................ 709/223 |
| 7,953,814 B1 | 5/2011 | Chasin et al. |
| 2002/0007453 A1 | 1/2002 | Nemovicher |
| 2002/0120697 A1 | 8/2002 | Generous et al. |
| 2002/0188863 A1* | 12/2002 | Friedman ...................... 713/201 |
| 2002/0199095 A1 | 12/2002 | Bandini et al. |
| 2003/0009698 A1 | 1/2003 | Lindeman et al. |
| 2003/0023736 A1 | 1/2003 | Abkemeier |
| 2003/0061506 A1 | 3/2003 | Cooper et al. |
| 2003/0074413 A1 | 4/2003 | Nielsen et al. |
| 2003/0101181 A1 | 5/2003 | Al-Kofahi et al. |
| 2003/0158905 A1 | 8/2003 | Petry et al. |
| 2003/0167402 A1* | 9/2003 | Stolfo et al. .................. 713/200 |
| 2003/0172294 A1* | 9/2003 | Judge ............................ 713/200 |
| 2003/0177387 A1 | 9/2003 | Osterwalder et al. |
| 2003/0187937 A1 | 10/2003 | Yao et al. |
| 2003/0187942 A1 | 10/2003 | Quine et al. |
| 2003/0212546 A1* | 11/2003 | Shaw ................................ 704/9 |
| 2003/0220978 A1 | 11/2003 | Rhodes |
| 2003/0236835 A1* | 12/2003 | Levi et al. ..................... 709/204 |
| 2004/0058673 A1 | 3/2004 | Irlam et al. |
| 2004/0078334 A1* | 4/2004 | Malcolm et al. ................. 705/50 |
| 2004/0088369 A1 | 5/2004 | Yeager et al. |
| 2004/0088551 A1 | 5/2004 | Dor et al. |
| 2004/0177110 A1 | 9/2004 | Rounthwaite et al. |
| 2004/0177120 A1 | 9/2004 | Kirsch |
| 2004/0177271 A1 | 9/2004 | Arnold et al. |
| 2004/0199597 A1* | 10/2004 | Libbey et al. ................. 709/207 |
| 2004/0267893 A1 | 12/2004 | Lin |
| 2005/0010644 A1 | 1/2005 | Brown et al. |
| 2005/0015626 A1 | 1/2005 | Chasin |
| 2005/0021649 A1* | 1/2005 | Goodman et al. ............. 709/207 |
| 2005/0044153 A1 | 2/2005 | Gross |
| 2005/0044170 A1 | 2/2005 | Cox et al. |
| 2005/0063365 A1* | 3/2005 | Mathew et al. ................ 370/352 |
| 2005/0064850 A1 | 3/2005 | Irlam et al. |
| 2005/0076084 A1* | 4/2005 | Loughmiller et al. ........ 709/206 |
| 2005/0080816 A1 | 4/2005 | Shipp |
| 2005/0081059 A1* | 4/2005 | Bandini et al. ................ 713/201 |
| 2005/0091272 A1 | 4/2005 | Smith et al. |
| 2005/0125667 A1 | 6/2005 | Sullivan et al. |
| 2005/0149747 A1 | 7/2005 | Wesinger et al. |
| 2005/0182959 A1 | 8/2005 | Petry et al. |
| 2005/0182960 A1 | 8/2005 | Petry et al. |
| 2005/0198159 A1 | 9/2005 | Kirsch |
| 2005/0198182 A1 | 9/2005 | Prakash et al. |
| 2005/0240617 A1 | 10/2005 | Lund et al. |
| 2005/0259667 A1* | 11/2005 | Vinokurov et al. ........... 370/401 |
| 2005/0266832 A1 | 12/2005 | Irlam et al. |
| 2006/0015726 A1 | 1/2006 | Callas |
| 2006/0031483 A1 | 2/2006 | Lund et al. |
| 2006/0039540 A1 | 2/2006 | Issinski |
| 2006/0047766 A1 | 3/2006 | Spadea |
| 2006/0075497 A1* | 4/2006 | Garg et al. ....................... 726/23 |
| 2006/0080432 A1 | 4/2006 | Spataro et al. |
| 2006/0080613 A1 | 4/2006 | Savant |
| 2006/0095524 A1 | 5/2006 | Kay et al. |
| 2006/0168006 A1* | 7/2006 | Shannon et al. .............. 709/206 |
| 2006/0168024 A1* | 7/2006 | Mehr et al. ................... 709/206 |
| 2006/0168057 A1 | 7/2006 | Warren et al. |
| 2006/0277220 A1 | 12/2006 | Patrick et al. |
| 2006/0277597 A1 | 12/2006 | Dreymann |
| 2007/0008987 A1 | 1/2007 | Manion et al. |
| 2007/0044152 A1 | 2/2007 | Newman et al. |
| 2007/0067392 A1 | 3/2007 | Torres et al. |
| 2007/0100949 A1 | 5/2007 | Hulten et al. |
| 2007/0106698 A1 | 5/2007 | Elliott et al. |
| 2007/0107059 A1 | 5/2007 | Chasin et al. |
| 2007/0214227 A1 | 9/2007 | Quinn |
| 2007/0244974 A1 | 10/2007 | Chasin |
| 2008/0294726 A1 | 11/2008 | Sidman |
| 2010/0030858 A1 | 2/2010 | Chasin |
| 2011/0197257 A1 | 8/2011 | Maes |
| 2011/0197275 A1 | 8/2011 | Chasin et al. |

OTHER PUBLICATIONS

Zachariassen, Rayan, ZMailer the Manual, v.1.99.26. 200602020935, available at http://www.zmailer.org/zman/zmanual.shtml, downloaded Apr. 28, 2006 (312 pages).

Sendmail, Inc., Sendmail.org home page, available at http://www.sendmail.org/, downloaded Nov. 6, 2005.

Lindberg, G., RFC 2505—Anti-Spam Recommendations for SMTP MTAs, The Internet Society, Feb. 1999, available at http://www.faqs.org/rfcs/rfc2505.html downloaded Nov. 6, 2005.

Postfix.org web site, available at http://www.postfix.org, downloaded Nov. 6, 2005.

Mail Abuse Prevention System, LLC, Basic Mailing List Management Guidelines for Preventing Abuse, available at http://web.archive.org/web/20010309004654/maps.vix.com/manage.html downloaded Nov. 6, 2005.

Stolfo, Salvatore J., et al., research paper, "Combining Behavior Models to Secure E-Mail Systems," Columbia University, May 16, 2003.

Bhattacharyya, Manasi, et al., research paper, "MET: An Experimental System for Malicious Email Tracking, "Columbia University and Cornell University.

Gupta, A., et al., research paper, "An Approach for Detecting Self-Propagating Email Using Anamoly Detection. " Department of Computer Science, Stony Brook University.

Stolfo, Salvatore J., et al., research paper, "Detecting Viral Propagations Using Email Behavior Profiles," Columbia University.

"Allegro's Mailzone Stops Back Orifice 2000," Allegro.net press release, Jul. 15, 1999, available at www.webarchive.org, downloaded Apr. 29, 2006.

"Allegro's Mailzone Stops Back Orifice 2000," Allegro.net press release, Jul. 14, 1999, available at www.webarchive.org downloaded Apr. 29, 2006, available at www.webarchive.org downloaded Apr. 29, 2006.

"Allegro's Mailzone Blocks Illegal MP3 Files," Allegro.net press release, Jul. 14, 1999, available at www.webarchive.org downloaded Apr. 29, 2006.

"Allegro's Mailzone Stops 'Worm' While on the 'Net," Allegro.net press release, Jun. 10, 1999, available at www.webarchive.org, downloaded Apr. 29, 2006.

"Allegro's Richard Bliss to speak at upcoming 'E-mail Outsourcing' conference," Allegro.net press release, Jun. 2, 1999, available at www.webarchive.org, downloaded Apr. 29, 2006.

"Phantom Menace' a real menace to network administration," Allegro.net press release, Apr. 28, 1999, available at www.webarchive.org downloaded Apr. 29, 2006.

"Allegro Mailzone Filters Junk E-Mail," Law Technology Product News, vol. 6, Issue 3, Mar. 1999, available at www.webarchive.org, downloaded Apr. 29, 2006.

Thyfault, Mary E., "Companies choose outside e-mail services for cost, functionality, and easy administration," Information Week, Aug. 2, 1999, available at www.informationweek.com downloaded Apr. 29, 2006.

"Allegro messaging company has protected 1,000 businesses from viruses," Dayton Business Journal, Jun. 11, 1999, available at www.dayton.bizjournals.com, downloaded Apr. 29, 2006.

McNamara, Paul, "Take my apps—please," NetworkWorld, May 31, 1999, available at www.networkworld.com, downloaded Apr. 29, 2006.

Mailzone Web Site, availabte at www.webarchive.org, downloaded Apr. 29, 2006.

Listserv 14.5 @ Miami University, "Allegro Mailzone Filters Unwanted E-mail," Jan. 25, 1999, available at www.listserv.muohio.edu, downloaded Apr. 29, 2006.

Non-Final Office Action mailed Aug. 4, 2009 in U.S. Appl. No. 11/365,130, filed Feb. 28, 2006.

Final Office Action mailed May 27, 2009 in U.S. Appl. No. 10/888,370, filed Jul. 9, 2004, by C. Scott Chasin.

Non-Final Office Action mailed Sep. 22, 2008 in U.S. Appl. No. 10/888,370, filed Jul. 9, 2004, by C. Scott Chasin.

Final Office Action mailed Jan. 16, 2008 in U.S. Appl. No. 10/888,370, filed Jul. 9, 2004, by C. Scott Chasin.

Non-Final Office Action mailed Jul. 31, 2007 in U.S. Appl. No. 10/888,370, filed Jul. 9, 2004, by C. Scott Chasin.

Non-Final Office Action mailed Apr. 28, 2009 in U.S. Appl. No. 11/372,970, filed Mar. 10, 2006, by C. Scott Chasin.

Non-Final Office Action mailed May 11, 2009 in U.S. Appl. No. 11/537,432, filed Sep. 29, 2006, by C. Scott Chasin.

Non-Final Office Action mailed Oct. 6, 2008 in U.S. Appl. No. 11/394,890, filed Mar. 31, 2006, by Wei Lin.

Woitaszek, M.; Shaaban, M.; Czernikowski, R., "Identifying junk electronic mail in Microsoft outlook with a support vector machine," Proceedings of the 2003 Symposium on Application and the Internet, Jan. 2003.

International Preliminary Report on Patentability and Written Opinion of the International Search Authority for PCT/US2006/32402, International Searching Authority, Mar. 24, 2009.

International Search Report for PCT/US2006/32402, International Searching Authority, Mar. 25, 2008.

International Search Report mailed Aug. 4, 2006 (2 pages), International Preliminary Report on Patentability issued Oct. 3, 2006 (1 page), and Written Opinion of the International Searching Authority mailed Aug. 4, 2006 (3 pages) for International Application No. PCT/US04/20899.

International Search Report mailed Dec. 2, 2009 (1 page), International Preliminary Report on Patentability issued Feb. 17, 2009 (1 page), and Written Opinion of the International Searching Authority mailed Dec. 2, 2009 (5 pages), for International Application No. PCT/US04/22846.

U.S. Appl. No. 11/365,130, filed Feb. 28, 2006.
U.S. Appl. No. 11/372,970, filed Mar. 10, 2006.
U.S. Appl. No. 11/394,890, filed Mar. 31, 2006.
U.S. Appl. No. 11/465,433, filed Aug. 17, 2006.
U.S. Appl. No. 11/537,432, filed Sep. 29, 2006.
U.S. Appl. No. 60/886,898, filed Jan. 26, 2007.

Graham, Better Bayesian Filtering, Jan. 2003 (12 pages).

M. Sahami, S. Dumais, D. Heckerman, and E. Horvitz, "A Bayesian approach to filtering junk e-mail", in Learning for Text Categorization—Papers from the AAAI Workshop, pp. 55-62, Madison, Wisconsin, 1998 (8 pages).

Sergeant, Internet Level Spam Detection and SpamAssassin 2.50, MessageLabs, http://spamassassin.apache.org/presentations/SpamConf2003.pdf, 2003 (21 pages).

Peer-to-Peer (P2P) Roadmap; Website: http://msdn2.microsoft.com/en-us/library/bb756997(printer).aspx, date retrieved Feb. 1, 2008, 4 pages.

People Near Me; Microsoft TechNet, Website: http://technet.microsoft.com/en-us/library/bb726969(printer).aspx, published Sep. 27, 2006, date retrieved Feb. 1, 2008, 6 pages.

"A Method to Detect Unknown Computer Virus Using Virtual Server," Takashi Miyake et al., Technical Report of Information Processing Society of Japan, 2002-CSEC-18, Jul. 19, 2002.

"Proposal of Nat/Proxy Traversing Remote Access Technology," Hideo Yoshimi et al., Technical Report of the Institute of Electronics, Information and Communication Engineers, NS2005-84, Sep. 8, 2005.

"Servey [sic] & Choice, Mail Filtering Software—Excellently High Degree of Freedom in Setting Up—Applicability to Coded Emails Starting," Manabu Takata, Nikkei Communications, No. 302, Sep. 20, 1999, pp. 121-127.

Apr. 18, 2011 First Japanese Office Action for Japanese Patent Application No. 2008-538876.

USPTO Oct. 31, 2007 Response to Jul. 31, 2007 Nonfinal Office Action from U.S. Appl. No. 10/888,370.

USPTO Jul. 31, 2007 Nonfinal Office Action from U.S. Appl. No. 10/888,370.

USPTO Jan. 16, 2008 Final Office Action from U.S. Appl. No. 10/888,370.

USPTO Mar. 17, 2008 RCE Response to Jan. 16, 2008 Final Office Action from U.S. Appl. No. 10/888,370.

USPTO May 21, 2008 Supplemental Response from U.S. Appl. No. 10/888,370.

USPTO Sep. 22, 2008 Nonfinal Office Action from U.S. Appl. No. 10/888,370.

USPTO Oct. 2, 2009 Response to Apr. 28, 2009 Nonfinal Office Action from U.S. Appl. No. 11/372,970.

USPTO Oct. 6, 2009 Nonfinal Office Action from U.S. Appl. No. 11/465,433.

USPTO Nov. 12, 2009 Response to May 11, 2009 Nonfinal Office Action from U.S. Appl. No. 11/537,432.

USPTO Dec. 28, 2009 Appeal Brief from U.S. Appl. No. 10/888,370.
USPTO Dec. 4, 2009 Response to Aug. 4, 2009 Nonfinal Office Action from U.S. Appl. No. 11/365,130.

USPTO Feb. 23, 2009 Response to Sep. 22, 2008 Nonfinal Office Action from U.S. Appl. No. 10/888,370.
USPTO Mar. 12, 2009 Supplemental Response from U.S. Appl. No. 10/888,370.
USPTO Apr. 28, 2009 Nonfinal Office Action from U.S. Appl. No. 11/372,970.
USPTO May 11, 2009 Nonfinal Office Action from U.S. Appl. No. 11/537,432.
USPTO May 27, 2009 Final Office Action from U.S. Appl. No. 10/888,370.
USPTO Aug. 4, 2009 Office Action from U.S. Appl. No. 11/365,130.
USPTO Oct. 21, 2010 Final Office Action from U.S. Appl. No. 11/372,970.
USPTO Oct. 6, 2010 Nonfinal Office Action from U.S. Appl. No. 11/365,130.
USPTO Jan. 12, 2010 Response to Oct. 6, 2009 Nonfinal Office Action from U.S. Appl. No. 11/465,433.
USPTO Dec. 1, 2010 Response to Sep. 1, 2010 Nonfinal Office Action from U.S. Appl. No. 12/185,517.
USPTO Dec. 12, 2010 After Final Response to Oct. 21, 2010 Final Office Action from U.S. Appl. No. 11/372,970.
USPTO Dec. 20, 2010 Response to Oct. 6, 2010 Nonfinal Office Action from U.S. Appl. No. 11/365,130.
USPTO Jan. 27, 2010 Final Office Action from U.S. Appl. No. 11/537,432.
USPTO Feb. 1, 2010 Final Office Action from U.S. Appl. No. 11/372,970.
USPTO Mar. 18, 2010 Final Office Action from U.S. Appl. No. 11/365,130.
USPTO Mar. 31, 2010 Examiner's Answer from U.S. Appl. No. 10/888,370.
USPTO Apr. 1, 2010 After Final Response to Feb. 1, 2010 Final Office Action from U.S. Appl No. 11/372,970.
USPTO Apr. 27, 2010 RCE Response to Jan. 27, 2010 Final Office Action from U.S. Appl. No. 11/537,432.
USPTO Apr. 28, 2010 Final Office Action from U.S. Appl. No. 11/465,433.
USPTO Apr. 28, 2010 RCE Response to Apr. 9, 2010 Advisory Action from U.S. Appl. No. 11/372,970.
USPTO Apr. 9, 2010 Advisory Action from U.S. Appl. No. 11/372,970.
USPTO May 13, 2010 Nonfinal Office Action from U.S. Appl. No. 11/372,970.
USPTO May 18, 2010 RCE Response to Mar. 18, 2010 Final Office Action from U.S. Appl. No. 11/365,130.
USPTO Jul. 28, 2010 RCE Response to Apr. 28, 2010 Final Office Action from U.S. Appl. No. 11/465,433.
USPTO Aug. 10, 2010 Response to May 13, 2010 Nonfinal Office Action from U.S. Appl. No. 11/372,970.
USPTO Sep. 1, 2010 Nonfinal Office Action from U.S. Appl. No. 12/185,517.
USPTO Jan. 21, 2011 Advisory Action from U.S. Appl. No. 11/372,970.
USPTO Jan. 27, 2011 Notice of Allowance from U.S. Appl. No. 11/365,130.
USPTO Mar. 21, 2011 Appeal Brief from U.S. Appl. No. 11/372,970.
USPTO Mar. 4, 2011 Final Office Action from U.S. Appl. No. 12/185,517.
European Patent Office Extended Search Report, Search Opinion, and Examiner's Preliminary Opinion in EPO Patent Application Serial No. 06789864.3-1244 mailed on Feb. 16, 2012.
Aug. 30, 2011 Japan Patent Office Final Office Action for Japanese Patent Application No. 2008-538876.
Dec. 13, 2011 Japan Patent Office Final Refusal in Japanese Patent Application Serial No. 2008-538876.
Notice of Allowance in U.S. Appl. No. 10/873,882 mailed on Jan. 3, 2006.
Advisory Action in U.S. Appl. No. 10/888,370 mailed on Apr. 11, 2008.
Request for Continued Examination in U.S. Appl. No. 10/888,370, filed Apr. 16, 2008.
Notice of Appeal in U.S. Appl. No. 10/888,370, filed Oct. 27, 2009.
Response to Non-Final Office action dated Oct. 6, 2010 in U.S. Appl. No. 11/365,130, filed Dec. 20, 2010.
Notice of Allowance in U.S. Appl. No. 11/365,130 mailed on Feb. 10, 2011.
Notice of Allowance in U.S. Appl. No. 11/365,130 mailed on Mar. 29, 2011.
Non-Final Office Action in U.S. Appl. No. 13/091,011 mailed on May 9, 2012.
Response to Non-Final Office Action dated May 9, 2012 in U.S. Appl. No. 13/091,011, filed May 9, 2012.
Notice of Allowance in U.S. Appl. No. 13/091,011 mailed on Aug. 17, 2012.
Corrected Notice of Allowance in U.S. Appl. No. 13/091,011 mailed on Oct. 2, 2012.
U.S. Appl. No. 13/726,607, filed Dec. 25, 2012, and entitled "Stopping and Remediating Outbound Messaging Abuse," Inventors C. Scott Chasin, et al.
Examiner's Answer to Appeal Brief in U.S. Appl. No. 11/372,970 mailed on Jun. 9, 2011.
Appellant's Reply Brief in in U.S. Appl. No. 11/372,970, filed Aug. 9, 2011.
Response to Non-Final Office Action dated Oct. 6, 2008 in U.S. Appl. No. 11/394,890, filed Mar. 10, 2009.
Notice of Allowance in U.S. Appl. No. 11/394,890 mailed on Jun. 26, 2009.
Request for Continued Examination in U.S. Appl. No. 11/394,890, filed Sep. 21, 2009.
Notice of Allowance in U.S. Appl. No. 11/394,890 mailed on Oct. 29, 2009.
Response to Non-Final Office Action dated May 11, 2009 in U.S. Appl. No. 11/537,432, filed Nov. 12, 2009.
Notice of Allowance in U.S. Appl. No. 11/537,432 mailed on Feb. 10, 2012.
Request for Continued Examination in U.S. Appl. No. 11/537,432, filed May 3, 2012.
Notice of Allowance in U.S. Appl. No. 11/537,432 mailed on Aug. 3, 2012.
Corrected Notice of Allowability in U.S. Appl. No. 11/537,432 mailed on Aug. 16, 2012.
Request for Continued Examination and Amendment in U.S. Appl. No. 11/537,432, filed Nov. 5, 2012.
Notice of Allowance in U.S. Appl. No. 11/537,432 mailed on Nov. 30, 2012.
Non-Final Office Action in U.S. Appl. No. 12/185,517 mailed on Sep. 1, 2010.
Non-Final Office Action in U.S. Appl. No. 11/465,433 mailed on Dec. 7, 2012.
Response Final Office Action dated Mar. 4, 2011 in U.S. Appl. No. 12/185,517, filed Jun. 6, 2011.
Advisory Action in U.S. Appl. No. 12/185,517 mailed on Jun. 29, 2011.
Notice of Appeal in U.S. Appl. No. 12/185,517, filed on Jul. 5, 2011.
Appeal Brief in U.S. Appl. No. 12/185,517, filed Oct. 5, 2011.
Examiner's Answer to Appeal Brief in U.S. Appl. No. 12/185,517 mailed on Jan. 9, 2012.
Appellant's Reply Brief in Response to Jan. 9, 2012 Examiner's Answer in U.S. Appl. No. 12/185,517, filed Mar. 9, 2012.

* cited by examiner

SUBSCRIBER REPUTATION FILTERING METHOD FOR ANALYZING SUBSCRIBER ACTIVITY AND DETECTING ACCOUNT MISUSE

CROSS-REFERENCE TO RELATED APPLICATIONS

This application claims the benefit of U.S. Provisional Application No. 60/638,208, filed on Dec. 21, 2004 and U.S. Provisional Application No. 60/693,927, filed on Jun. 23, 2005, both of which are hereby incorporated by reference for all purposes.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright© 2004-2005 MX Logic, Inc.

BACKGROUND

1. Field

Embodiments of the present invention generally relate to systems and methods for remediating outbound messaging abuse. More specifically, embodiments of the present invention provide for systems and methods of allowing service providers filter outbound subscriber email traffic for spam and/or worm-oriented messages using one or more of individual subscriber email sending reputation, real-time analysis of message content and behavior-based anomaly detection.

2. Description of Related Art

Reputation has become a new frontier in spam fighting and many different companies have introduced reputation databases that provide insight into the historical email sending behavior of Internet Protocol (IP) addresses or email servers. These new email reputation services also are beginning to provide accreditation services, where email sending organizations that have no email sending history can pay to have one of these services vouch for them, presumably after a fair amount of due diligence has been done by the accrediting service.

Using reputation on the Internet to infer future behavior or to determine access to services is relatively new. However, there have been some implementations, such as EBay's seller reputation or Amazon's rating system for reviewers that have worked fairly well in minimizing participation risk. But, unlike the EBay and Amazon models, the email reputation schemes that have been introduced to the market build their reputation not from individuals, but rather from organizational identifiers, such as IP addresses or domain names.

There are problems with using IP addresses to track email sending behavior. For example, it is fairly common for a message to travel multiple hops before arriving at a recipient's email gateway, thus making it difficult to always identify the true IP address of the originating sender. In fact, as it turns out, those that would be most likely to hide their email sending identity or originating IP address, often will purposely route their messages through several unauthorized gateways.

Meanwhile, because the email protocol does not provide for authentication, domain name reputation for email sending has not had an opportunity to be successful. However, the industry anticipates adopting a protocol extension that will remove fraudulent email envelopes and provide reputation services with a static identity for organizations in which email sending behavior can be associated.

Since IP addresses and domain names are usually tied to organizations, they are often shared by all the end-users within those organizations. Most Internet service providers use dynamic IP addresses for their subscribers, which provide a new IP address with each Internet session. Other service providers and enterprises force their end users to send their messages through authenticated email gateways that have their own shared IP addresses. The lack of persistent identity with IP addresses poses a real risk for email sending reputation, which will mostly be based on transient user behavior.

For organizations with small groups of email senders it is probably okay for their reputation to be tied to a domain name; however, for larger businesses and service providers, this creates an enormous challenge as the organizational reputation is constructed from the aggregate of each individual user's behavior. In some instances, millions of independent end users are responsible for an organization's email sending behavior. Worse yet, an end user's identity can be hijacked by a spam sending virus, thereby compounding the trust problem.

SUMMARY

Systems and methods are described for allowing subscriber message sending profiles to be maintained and used in conjunction with behavior-based anomaly detection techniques and traditional content-based spam signature filtering to enable application of appropriate message disposition policies to outbound subscriber message traffic. According to one embodiment, subscriber profiles are constructed for multiple subscriber accounts associated with a service provider based on outbound message flow originated from the subscriber accounts. Then, possible subscriber account misuse may be discovered by performing behavior-based anomaly detection, including a comparison of a subscriber profile associated with the subscriber account with recent subscriber account usage information, to identify one or more behavioral anomalies in outbound message flow originated from a subscriber account, the behavior-based anomaly detection.

A more complete understanding of various embodiments and features of the present invention may be derived by referring to the detailed description of preferred embodiments and claims when considered in connection with the figures.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

Figure 1:
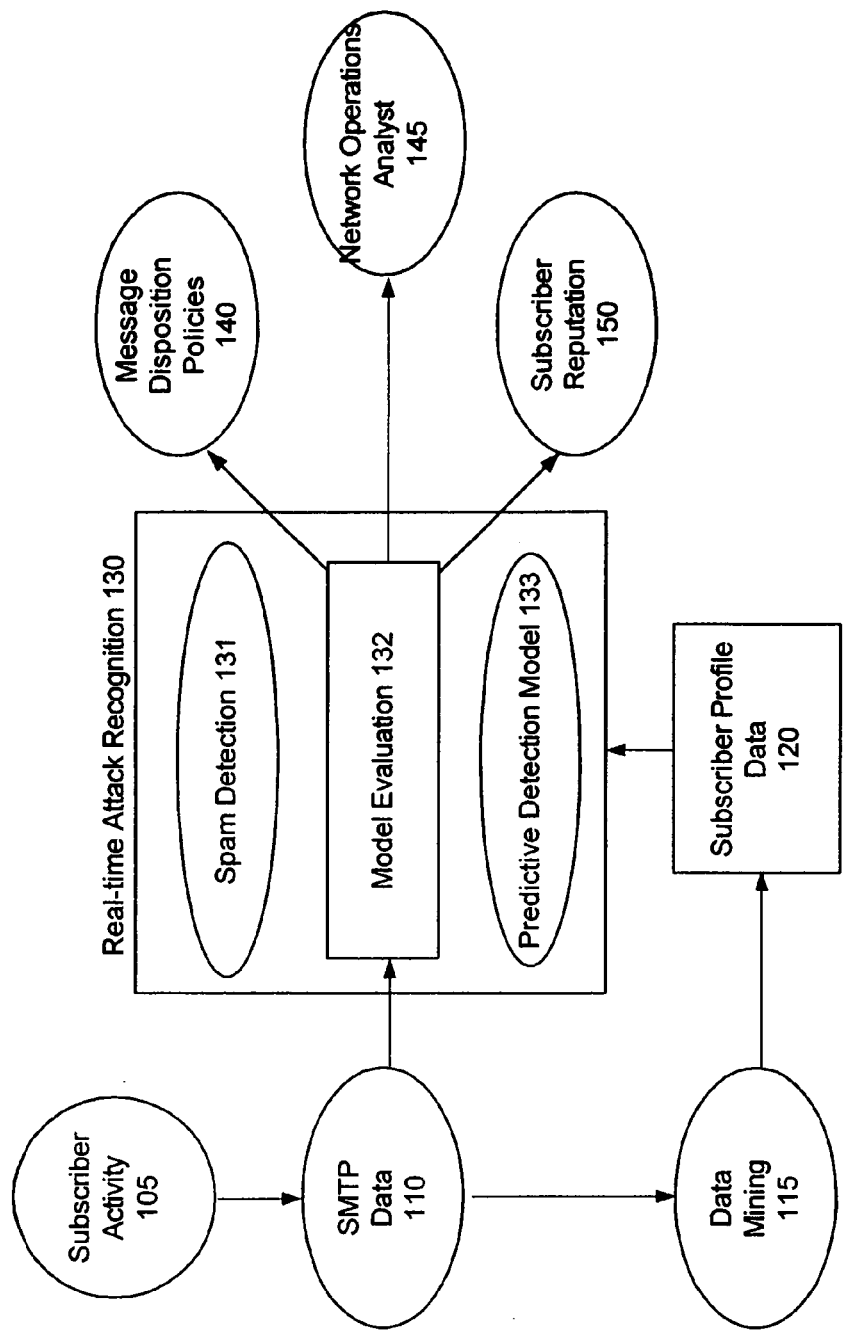
FIG. 1 conceptually illustrates a real-time attack recognition architecture according to one embodiment of the present invention.

Systems and methods are described for allowing subscriber message sending profiles to be maintained and used in conjunction with behavior-based anomaly detection techniques and traditional content-based spam signature filtering to enable application of appropriate message disposition policies to outbound subscriber message traffic. According to one embodiment, a sender reputation gateway (SRG) may be employed by an organization, such as an Internet service provider (ISP), service provider or other company, to police email sending conduct of their subscribers and thereby protect their organizational email sending reputation.

In one embodiment, the SRG models individual subscriber accounts and detects deviations from this model in outbound message flow to identify potential misuse of subscriber accounts. For example, the SRG may build subscriber profiles for each subscriber based on behavior data extracted from each email message originated by the subscriber. A reputation score or other measure of subscriber trustworthiness may then be based upon short-term and/or long-term reputation data. Such subscriber reputation data may be used to determine an immediate email action for a current email message in question and/or a long-term subscriber action for all subsequent email messages originated by the particular subscriber. In one embodiment, reputation data generated from a single email message may be used to determine message disposition, e.g., deny, add blind carbon copy (bcc) recipient, etc., for that message itself. According to other embodiments, reputation data generated from a single email message can be combined with long-term reputation data to determine if actions need to be taken against the subscriber, such as redirect to relay pool, reduce the subscriber's privileges or lower the subscriber's trustworthiness rating.

The SRG may perform multiple content filters on outbound subscriber traffic. In addition to the reputation filter, the content filters may include one or more of a spam filter, a virus filter, a phishing filter and a throttle filter. In one embodiment, the SRG also provides web-based access to network operations analysts to message disposition policies, notifications, alerts, submission status and traffic reports.

In the following description, for the purposes of explanation, numerous specific details are set forth in order to provide a thorough understanding of embodiments of the present invention. It will be apparent, however, to one skilled in the art that embodiments of the present invention may be practiced without some of these specific details.

Embodiments of the present invention may be provided as a computer program product which may include a machine-readable medium having stored thereon instructions which may be used to program a computer (or other electronic devices) to perform a process. The machine-readable medium may include, but is not limited to, floppy diskettes, optical disks, compact disc read-only memories (CD-ROMs), and magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions. Moreover, embodiments of the present invention may also be downloaded as a computer program product, wherein the program may be transferred from a remote computer to a requesting computer by way of data signals embodied in a carrier wave or other propagation medium via a communication link (e.g., a modem or network connection).

While, for convenience, various embodiments of the present invention may be described with reference to outbound email message abuse, the present invention is equally applicable to various other forms of asynchronous outbound messages, such as instant messages, mobile messages (e.g., SMS, MMS), voice mail and the like.

For the sake of illustration, various embodiments of the present invention are described herein in the context of computer programs, physical components, and logical interactions within modem computer networks. Importantly, while these embodiments describe various aspects of the invention in relation to modem computer networks and programs, the method and apparatus described herein are equally applicable to other systems, devices, and networks as one skilled in the art will appreciate. As such, the illustrated applications of the embodiments of the present invention are not meant to be limiting, but instead exemplary. Other systems, devices, and networks to which embodiments of the present invention are applicable include, but are not limited to, cellular phones, personal digital assistants (PDAs), pagers, BlackBerry® devices and the like.

Terminology

Brief definitions of terms, abbreviations, and phrases used throughout this application are given below.

The terms "connected" or "coupled" and related terms are used in an operational sense and are not necessarily limited to a direct physical connection or coupling. Thus, for example, two devices may be couple directly, or via one or more intermediary media or devices. As another example, devices may be coupled in such a way that information can be passed therebetween, while not sharing any physical connection on with another. Based on the disclosure provided herein, one of ordinary skill in the art will appreciate a variety of ways in which connection or coupling exists in accordance with the aforementioned definition.

The phrases "in one embodiment," "according to one embodiment," and the like generally mean the particular feature, structure, or characteristic following the phrase is included in at least one embodiment of the present invention, and may be included in more than one embodiment of the present invention. Importantly, such phases do not necessarily refer to the same embodiment.

The phrase "Internet service provider" or "ISP" generally refers to a service provider or other organization that provides access to the Internet. ISPs may provide service via modem, ISDN, cable, DSL or the like and may also offer private line hookups (e.g., T1, fractional T1, etc.). As used herein, the term ISP is intended to encompass online services, such as America Online and CompuServe, that provide members with Internet access as well as members only content, forums and services. While ISPs are typically fee-based companies that provide third party subscribers or members with "dial-up" or direct access to the Internet via SLP, PPP, or TCP/IP, as used herein the term ISP is also intended to encompass companies in their role as employers supplying Internet access to employees and/or contractors. Therefore, for purposes of this application, an enterprise supplying email accounts to its employees acts as an ISP and the employees would be considered subscribers of the ISP.

If the specification states a component or feature "may", "can", "could", or "might" be included or have a characteristic, that particular component or feature is not required to be included or have the characteristic.

The term "responsive" includes completely or partially responsive.

The phrase "service provider" generally refers to a company that provides users with services and/or subscriptions to a messaging network, such as the Internet, a wireless network, a mobile phone network and/or the like. As used herein, the phrase "service provider" is intended to encompass not only companies, such as ISPs, wireless operators, carriers and the like, that may provide access to messaging networks for a fee, but additionally is intended to encompass companies acting in their capacities as employers providing their employees and/or contractors with access to messaging networks. Consequently, for purposes of this application, an enterprise supplying email, voice, voice mail, mobile phone, text messaging and/or other messaging services to its employees and/or contractors acts as a service provider with respect to such employees and/or contractors and such employees and/or contractors would be considered subscribers of the service provider.

The term "subscriber" generally refers to an individual or company that is a user of services provided by a service provider. For purposes of clarity, in addition to covering the traditional notion of a subscriber as an individual or company that pays a fee for use and/or access to services provided by the service provider, as used herein, the term subscriber is intended to encompass employees, consultants, contractors and/or the like that are provided with services (e.g., email, voice, voice mail, mobile phone, wireless, text messaging and/or other messaging accounts) by virtue of their relationship with an employer or company.

FIG. 1 conceptually illustrates a real-time attack recognition architecture 130 according to one embodiment of the present invention. In the example depicted, based upon subscriber profile data 120 and SMTP data 110 resulting from subscriber activity 105, the real-time attack recognition architecture 130 (i) applies appropriate message disposition policies 140 to outbound message traffic, (ii) alerts a network operations analyst 145 (e.g., a service provider administrator, network operations center or abuse staff) of potential subscriber account misuse, and (iii) builds and modifies subscriber reputation 150. According to one embodiment, subscriber reputation 150 may be additionally influenced by factors, data and/or internal or external inputs other than SMTP data 110. For example, the subscriber's computer may communicate information to the service provider regarding the presence or absence of certain software. The presence of anti-virus or personal security software installed on a subscriber's computer may positively affect subscriber reputation 150 and the absence of such software may negatively affect subscriber reputation 150. Further, the version of the anti-virus or personal security software installed on the subscriber's computer, whether updates are enabled, and other factors may be taken into consideration when determining subscriber reputation 150.

Traditional filtering technologies sometimes do not catch new, emerging threats fast enough for effective outbound abuse containment. In one embodiment, the real-time attack recognition engine 130 includes both a spam detection process 131 and a predictive detection model 133 thereby allowing subscriber reputation to be constructed, modified and/or weighted by a model evaluation process 132 based on both content-based spam filtering approaches (e.g., signature and/or statistical spam detection) and behavior-based anomaly detection techniques, described further below, which, in general, seek to identify changes in a sender's observed SMTP behavior to influence the sender's reputation score.

According to the present example, a data mining process 115 maintains subscriber profile data 120 by tracking, aggregating and applying statistical analysis to various subscriber behavior attributes extracted from SMTP data 110. For example, in one embodiment, subscriber profile data 120 may include, but is not limited to, metrics regarding one or more of:

the total number of messages originated by the subscriber;
the total number of messages originated by the subscriber suspected of being spam;
the total number of messages originated by the subscriber suspected of containing a virus;
the average number of messages originated by the subscriber;
the average number of messages originated by the subscriber within a predefined time interval;
the average size of messages originated by the subscriber;
the largest size message originated by the subscriber;
the maximum size permitted to be originated by the subscriber;
the average number of recipients to which messages originated by the subscriber are addressed;
the largest number of recipients on a particular message originated by the subscriber;
the maximum number of recipients permitted to be addressed by the subscriber on an outbound message;
the frequency of recipients;
the address format (e.g., pretty name) employed;
the average number of message header lines in messages originated by the subscriber;
the maximum number of message header lines in messages originated by the subscriber;
the average Bayesian spam filter probability score for messages originated by the subscriber;
the number of messages originated by the subscriber with attachments;
the number of messages originated by the subscriber with attachments of certain types or groups of types (e.g., .exe, .com, .sys, .dll, .scr, .cpl, .api, .drv, .bpl, .zip, etc.);
the number of messages originated by the subscriber via a particular mailer;
the number of messages originated by the subscriber that include content from a particular character set; and
standard deviations relating to the foregoing.

Such metrics may be maintained in aggregate, used to determine time of day pattern patterns and/or may be subtotaled by particular time intervals (e.g., previous week, hour or five minute interval; current week, hour or five minute interval). Advantageously, by identifying changes in a user's sending behavior, the real-time attack recognition engine 130 may detect abuse faster than traditional filters. This will result in more effective abuse containment, leading to better outbound reputation scores for the service provider's outbound MTAs, resulting in less frequent blacklisting and thus better quality of service through better email deliverability.

According to one embodiment, there are two contexts in which reputation scores may be used: to identify an immediate email action and to establish long-term subscriber actions. With respect to immediate email action, reputation data generated from a single email can be used to determine what action (deny, bcc, etc.) to take on the single email itself. Reputation data generated from a single email can be combined with long-term reputation data (e.g., subscriber profiles) to determine if long-term subscriber actions need to be taken against the subscriber (such as redirection to relay pool or whether subscriber privileges are reduced). In implementing long-term subscriber actions, an analogy can be made to someone who bounces a check. The check itself will have a specific action taken on it, but the action taken on the check writer will be affected by whether this is his/her first bad check or whether the writer has a history of bad checks.

According to one embodiment, reputation-based routing may be performed by the SRG. For example, email messages originated by a subscriber having below a predetermined threshold reputation score may be routed to a transient mail server or dirty pool of IP addresses to protect the service providers' outbound mail server reputation.

Figure 2:
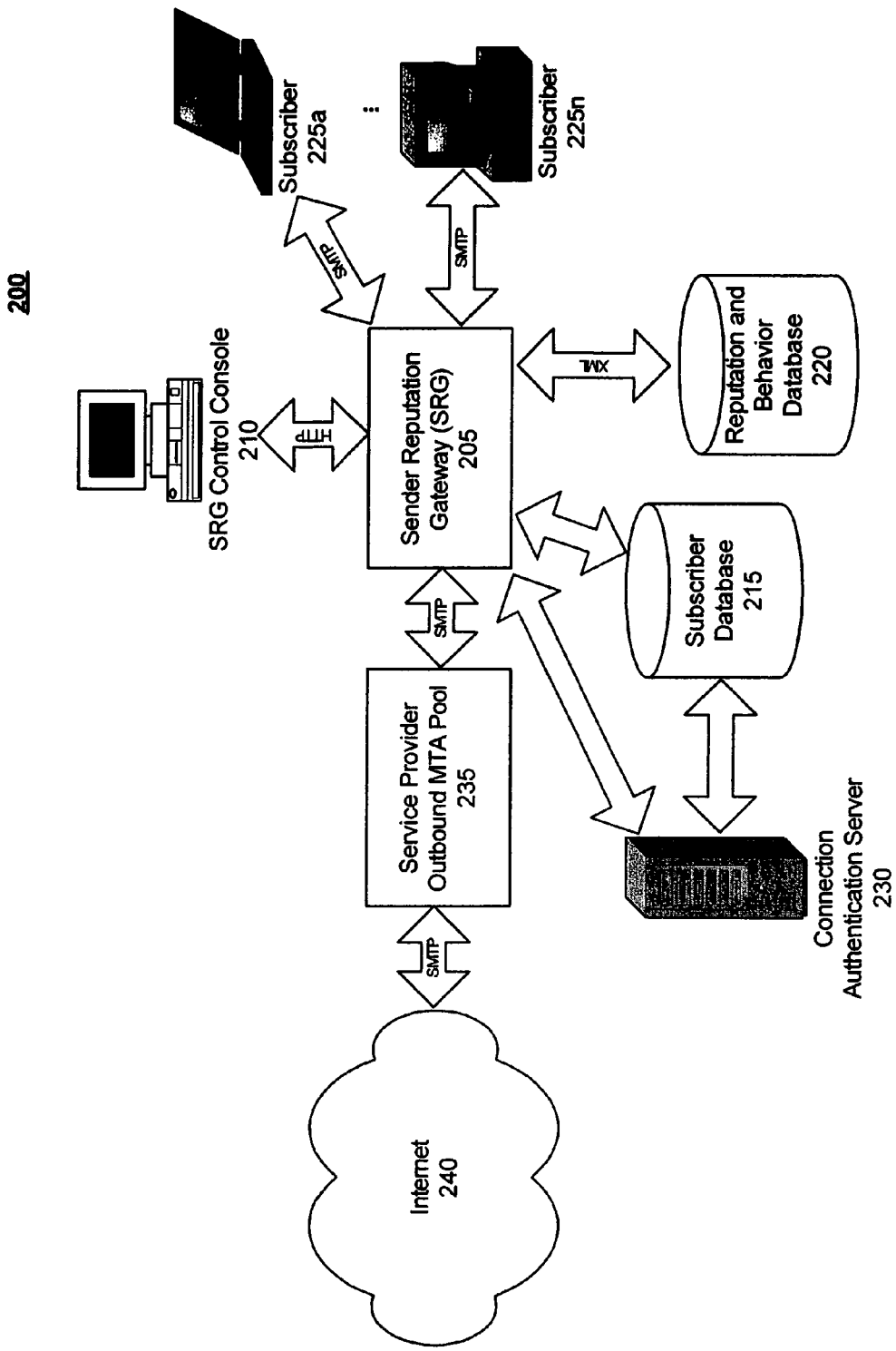
FIG. 2 is a simplified high level architectural view of a service provider network employing sender reputation management functionality in accordance with one embodiment of the present invention.
Figure 3:
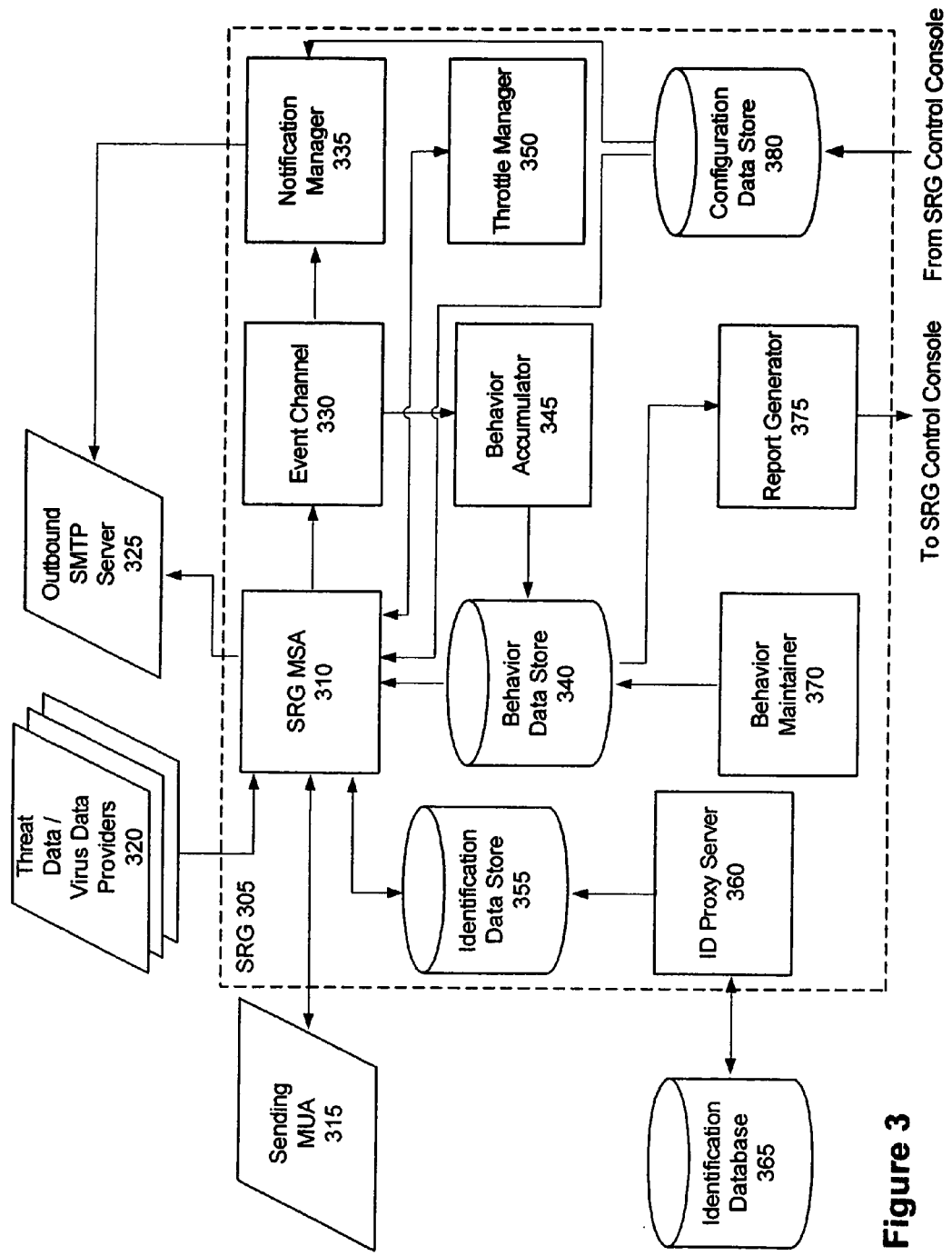
FIG. 3 illustrates interactions among various functional units of a sender reputation gateway according to one embodiment of the present invention.

FIG. 2 is a simplified high level architectural view of a service provider network 200 employing sender reputation management functionality in accordance with one embodiment of the present invention. Traditionally, the service provider's outbound delivery pool, e.g., service provider outbound MTA pool 235, interfaces directly with subscribers 225a-225n to deliver outbound message traffic originated by the subscribers 225a-225n to their intended destinations via the Internet 240. According to the present example, a sender reputation gateway (SRG) 205 is logically positioned in front of service provider outbound MTA pool 235 and acts as a proxy for the service provider outbound MTA pool 235 by servicing and responding to SMTP requests directed to the service provider outbound MTA pool 235 issued by subscribers 225a-225n.

As described further below, SRG 205 may extract behavior attributes, such as those identified above, from outbound message traffic originated by authenticated users and continuously update and store reputation and message sending behavior profiles within a reputation and behavior database 220 for each subscriber 225a-225n based upon the extracted behavior attributes. According to one embodiment, when the reputation and message sending behavior data for a particular subscriber is sufficient to identify behavioral anomalies within a desired confidence interval, the SRG 205 may use the subscriber message sending behavior profile in addition to or instead of message content to filter outbound messages.

According to one embodiment, the SRG 205 interacts with a connection authentication server 230, such as a Remote Authentication Dial-In User Service (RADIUS) server, and a subscriber database 215 to correlate messaging abuse history with true subscriber identity (obtained via IP address, SMTP AUTH ID, RADIUS ID, web site login ID, Instant Messaging ID, MIN (telephone number) or other means).

In the embodiment depicted, an SRG control console 210 is a web-based graphical user interface using HTTP or HTTPS protocols. The SRG control console 210 may provide multiple levels of security, accessibility, configuration entities and user roles. According to one embodiment, the SRG control console 210 is the primary interface used by administrators to configure, view and maintain message policies, traffic, system configurations and user access. In one embodiment, the SRG user interface and menu choices are role driven, thereby limiting accessibility to information and data to those user roles permitted to view and/or modify same. As described further below, the SRG control console 210 may also provide various reports to administrators of the service provider network, such as those detailing information about email traffic, filtering, policies, and system usage. As described further below, in one embodiment, depending upon the particular message content filtering configuration, which may be specified via the SRG control console 210, the SRG 205 may apply various anti-virus engines and/or spam filters to outbound message traffic.

Exemplary Computer System Overview

Figure 4:
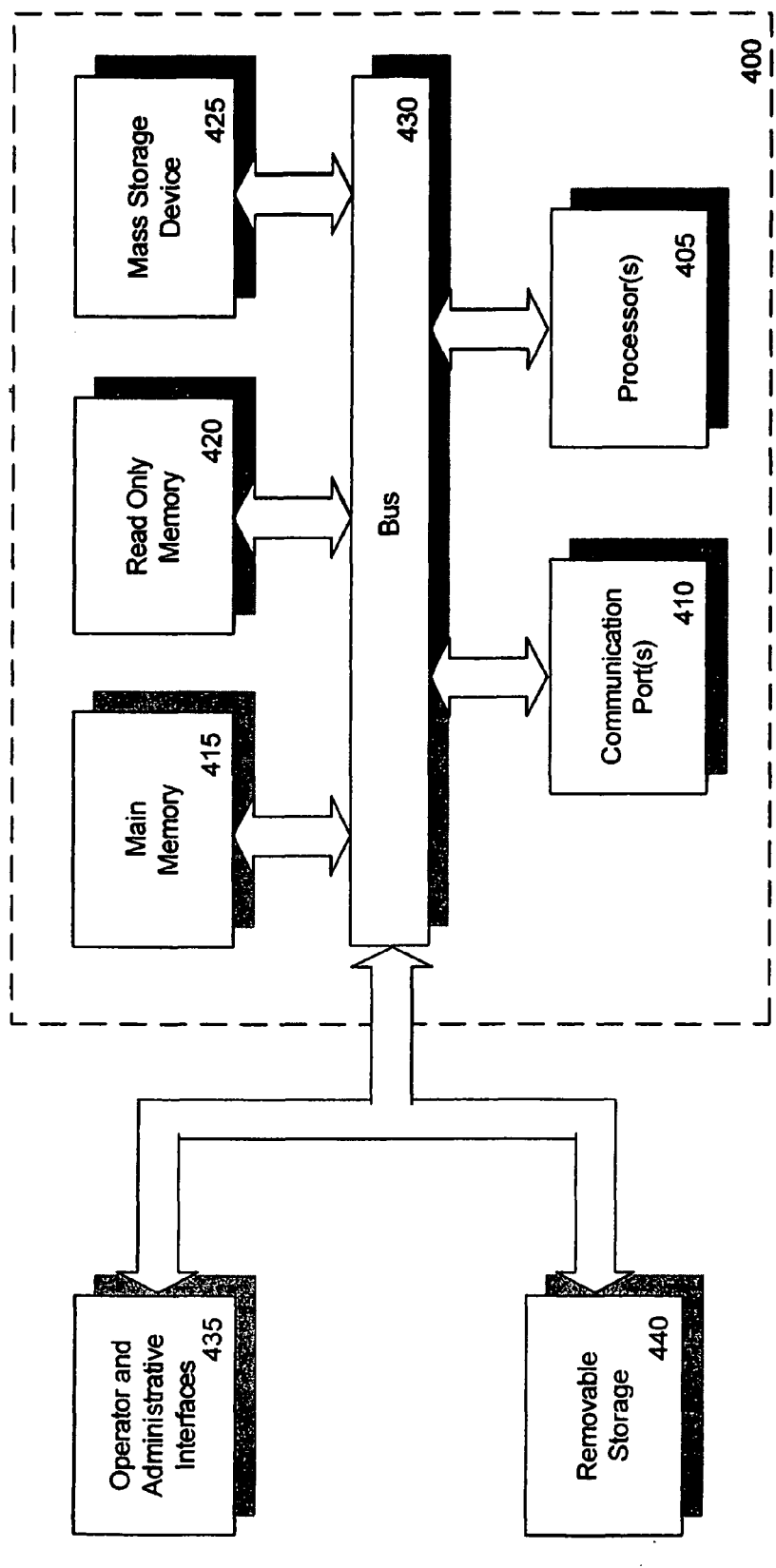
FIG. 4 illustrates an example of a computer system with which embodiments of the present invention may be utilized.
Figure 5:
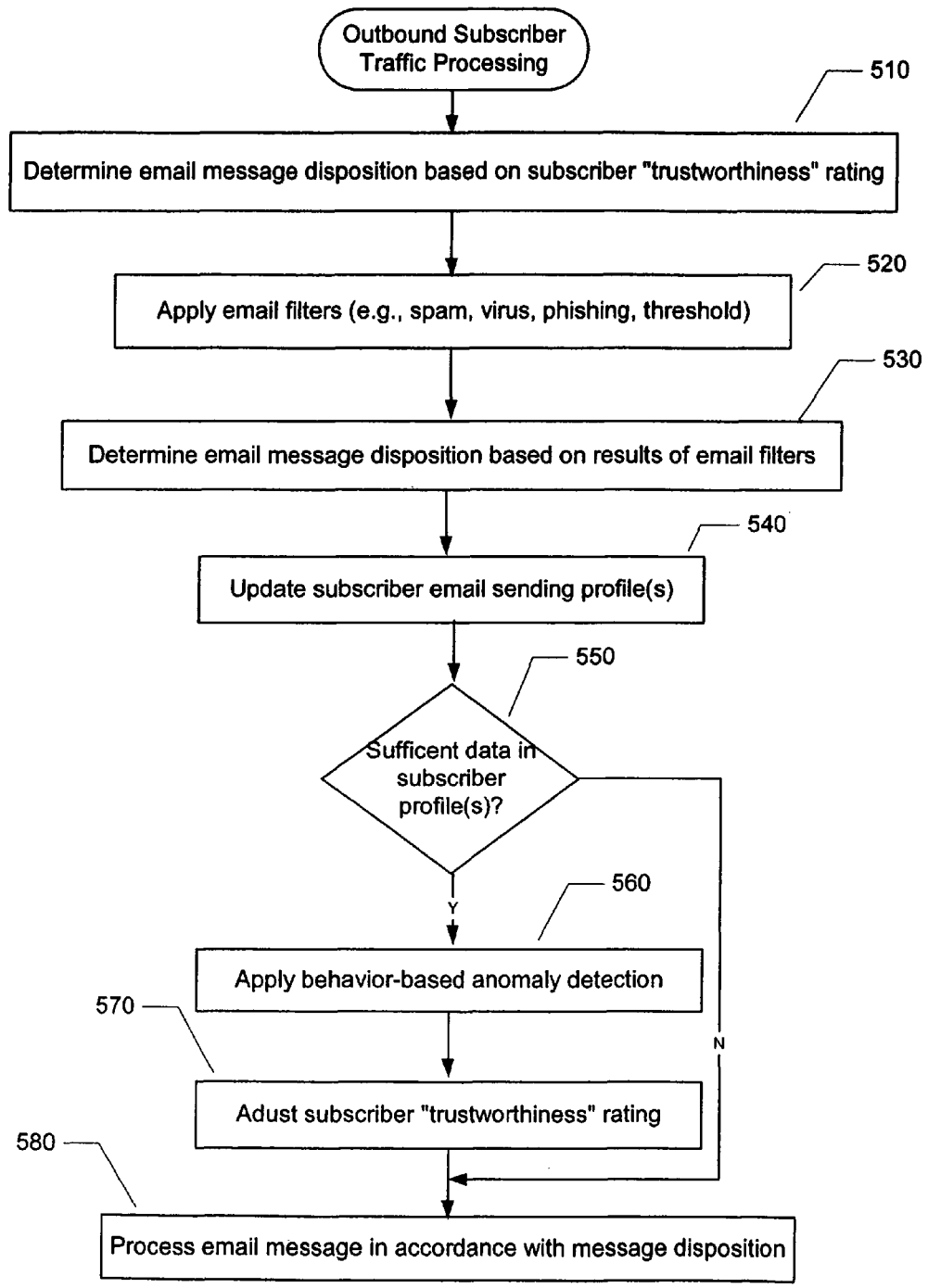
FIG. 5 is a flow diagram illustrating outbound subscriber traffic processing in accordance with one embodiment of the present invention.
Figure 6:
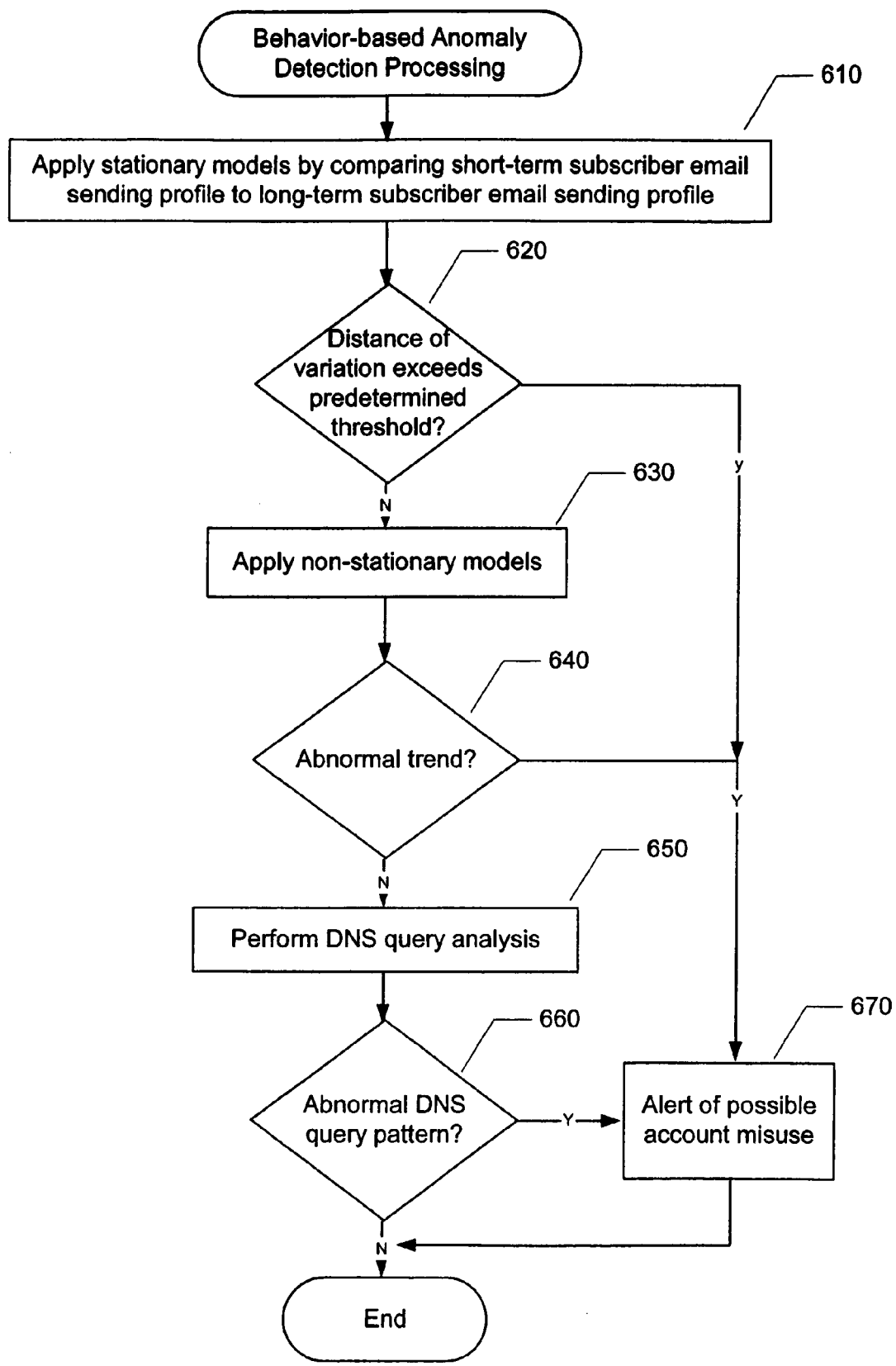
FIG. 6 is a flow diagram illustrating behavior-based anomaly detection processing in accordance with one embodiment of the present invention.
Figure 7A:
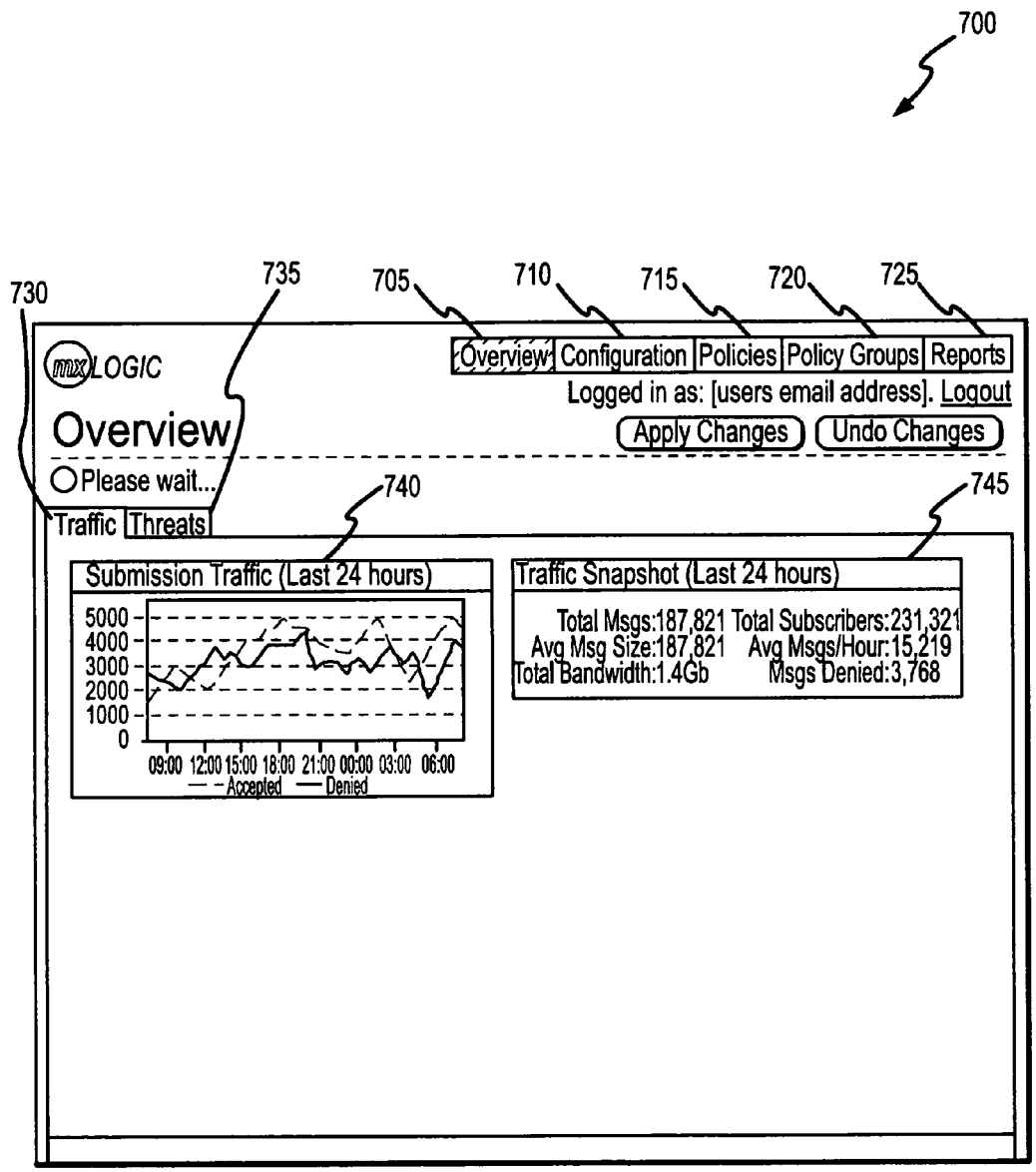
FIGS. 7A-B depict various exemplary overview user interface (UI) screen shots in accordance with one embodiment of the present invention.
Figure 7B:
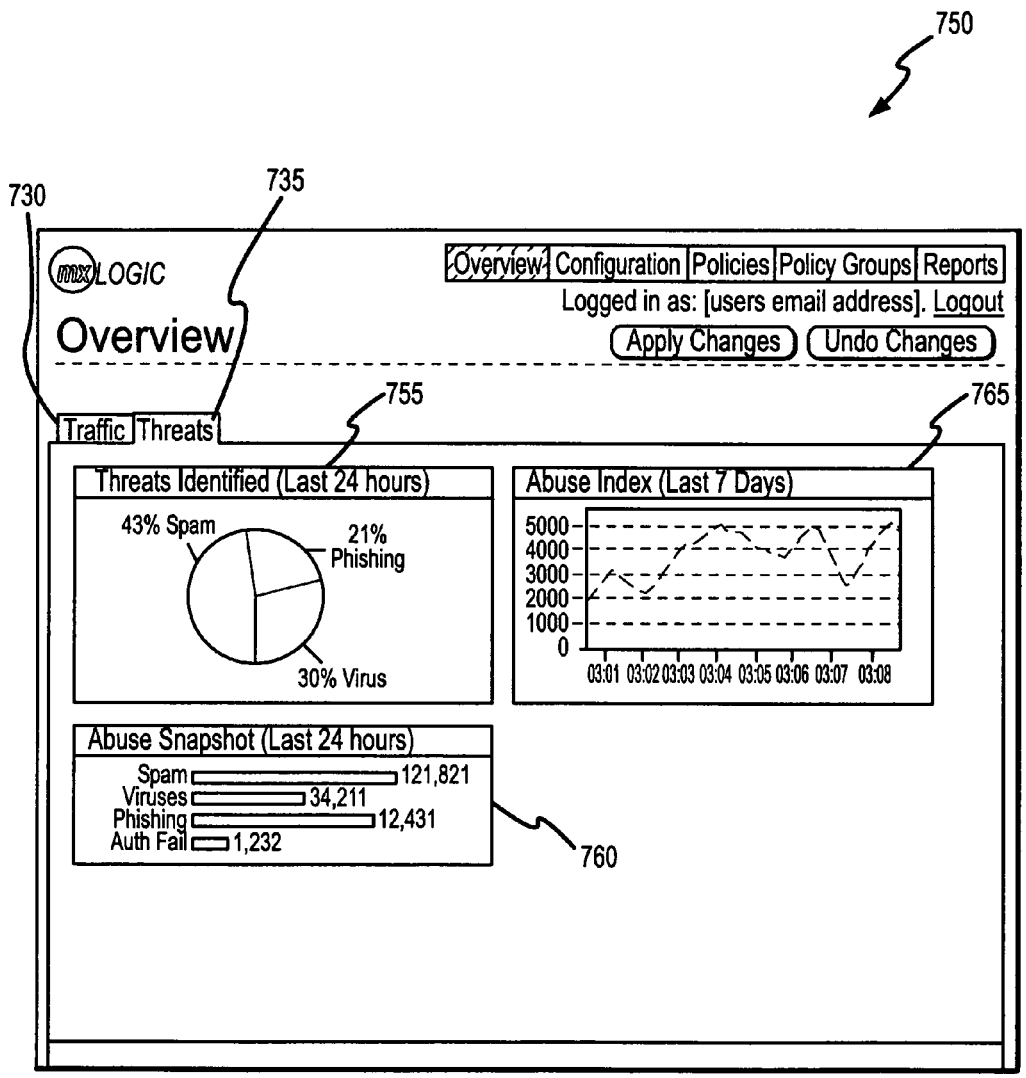
Figure 8A:
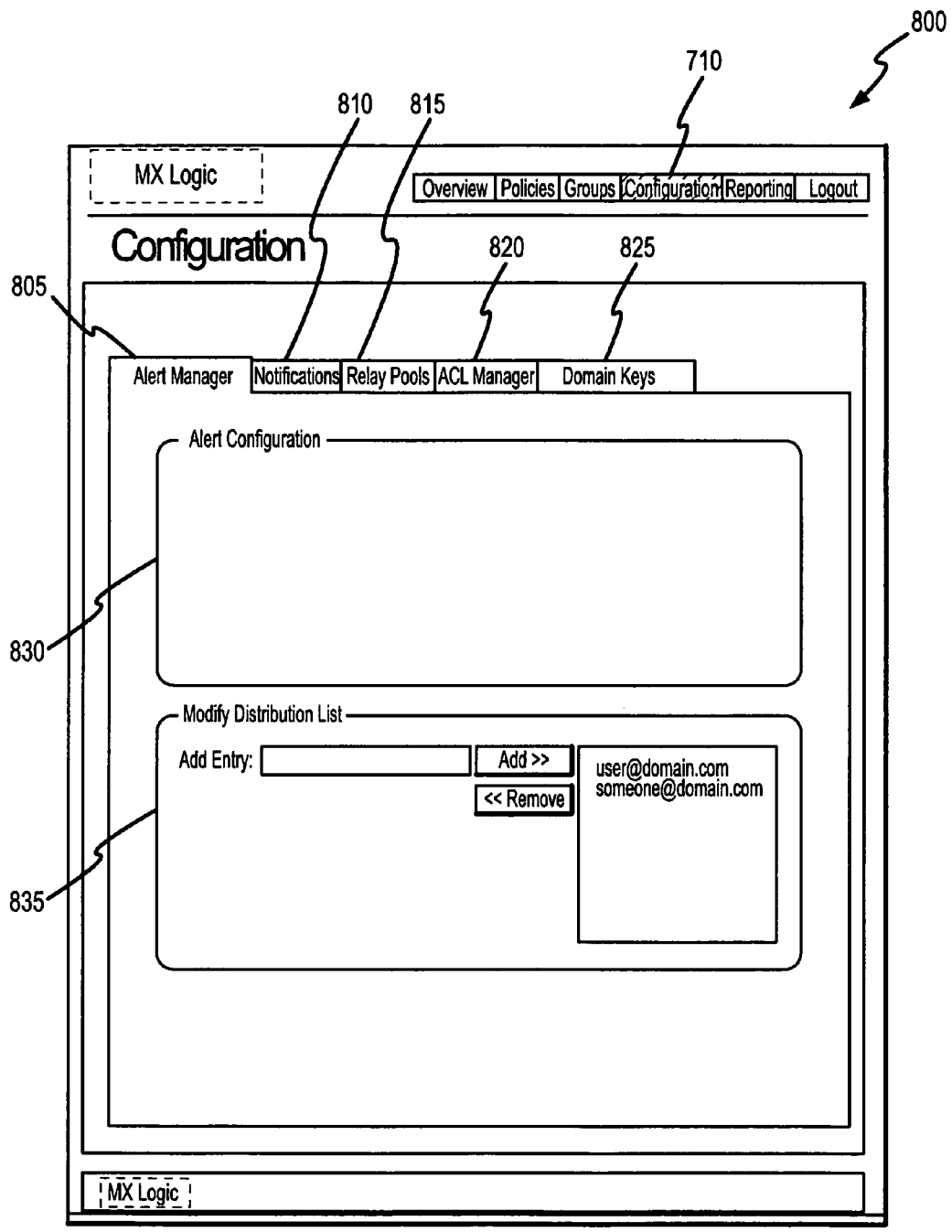
FIGS. 8A-E depict various exemplary configuration UI screen shots in accordance with one embodiment of the present invention.
Figure 8B:
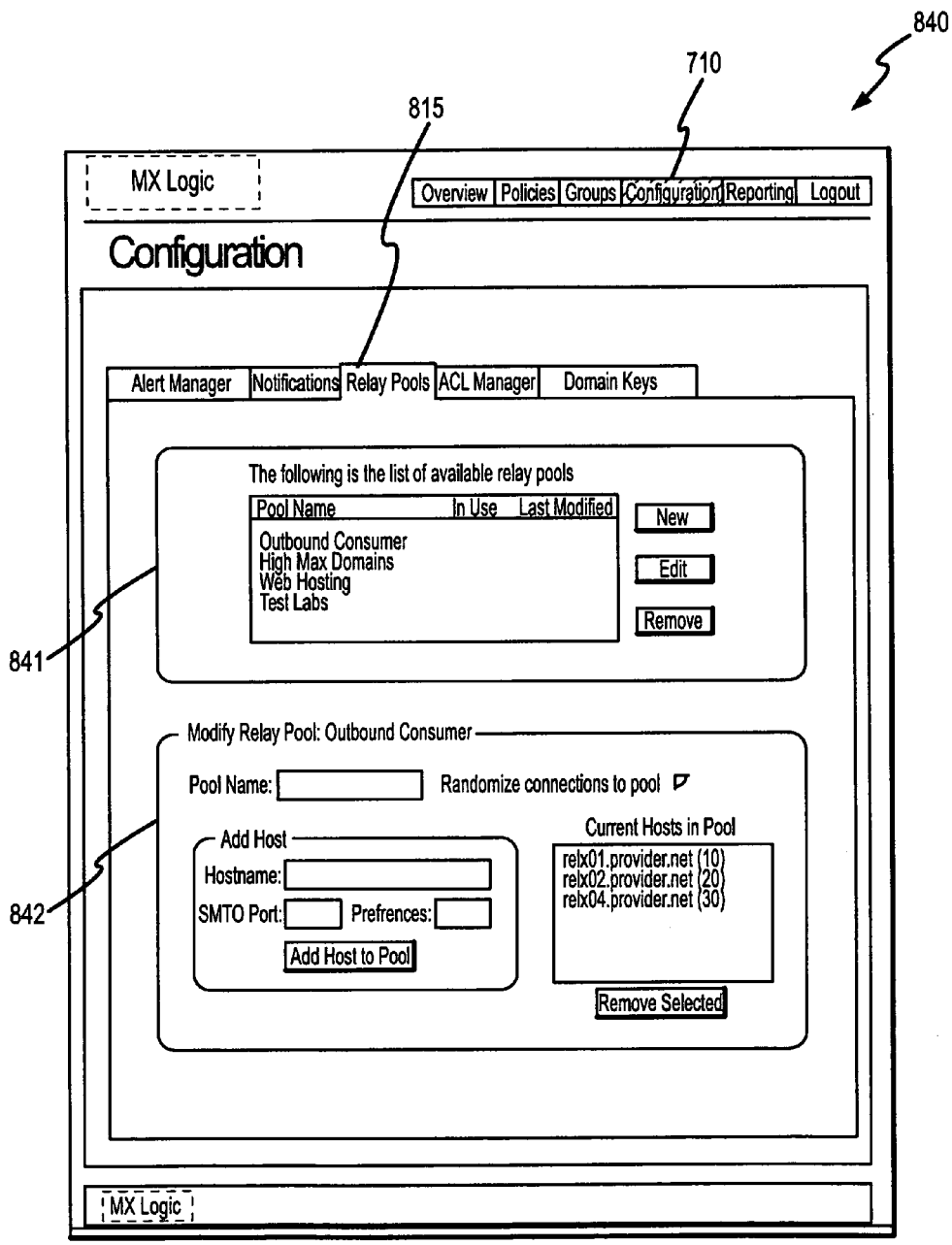
Figure 8C:
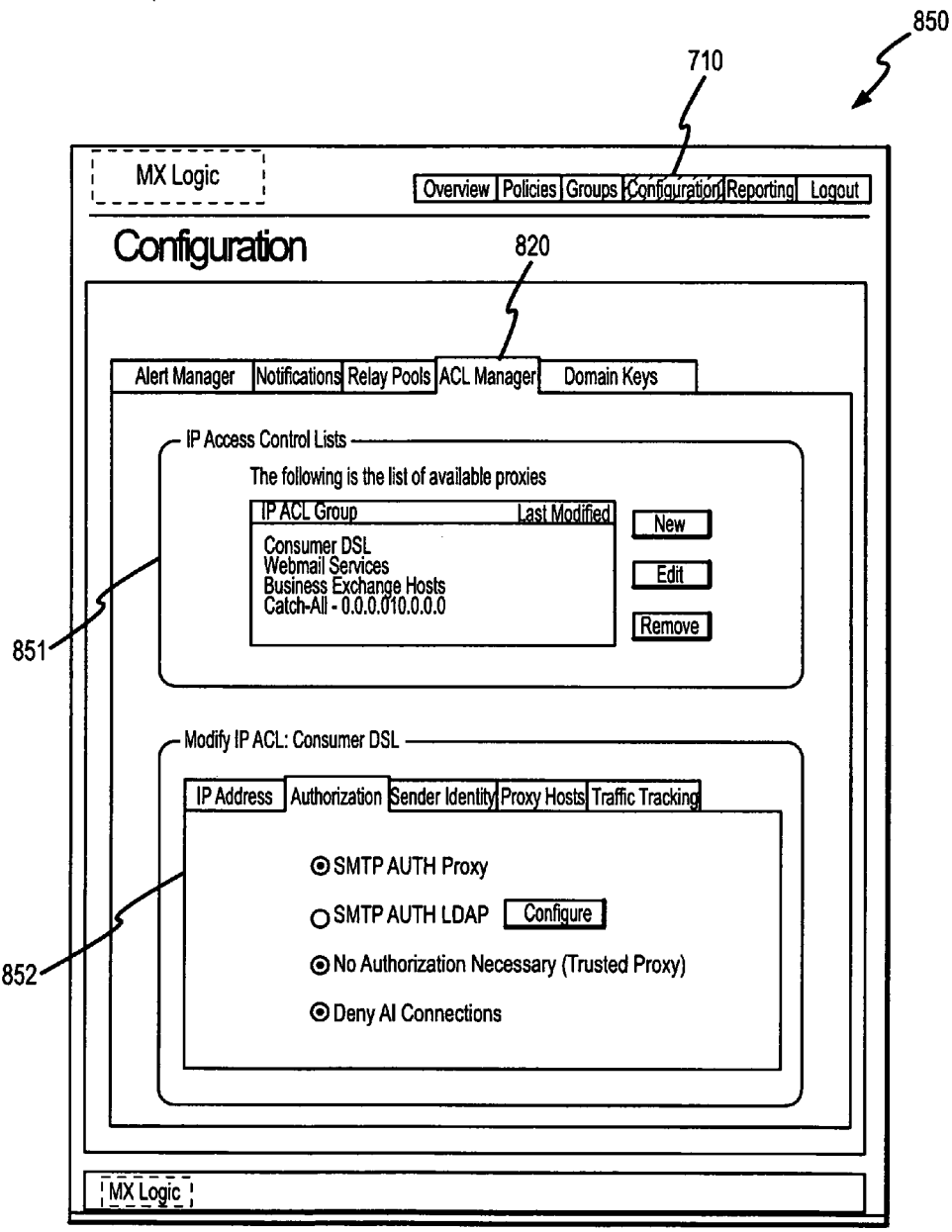
Figure 8D:
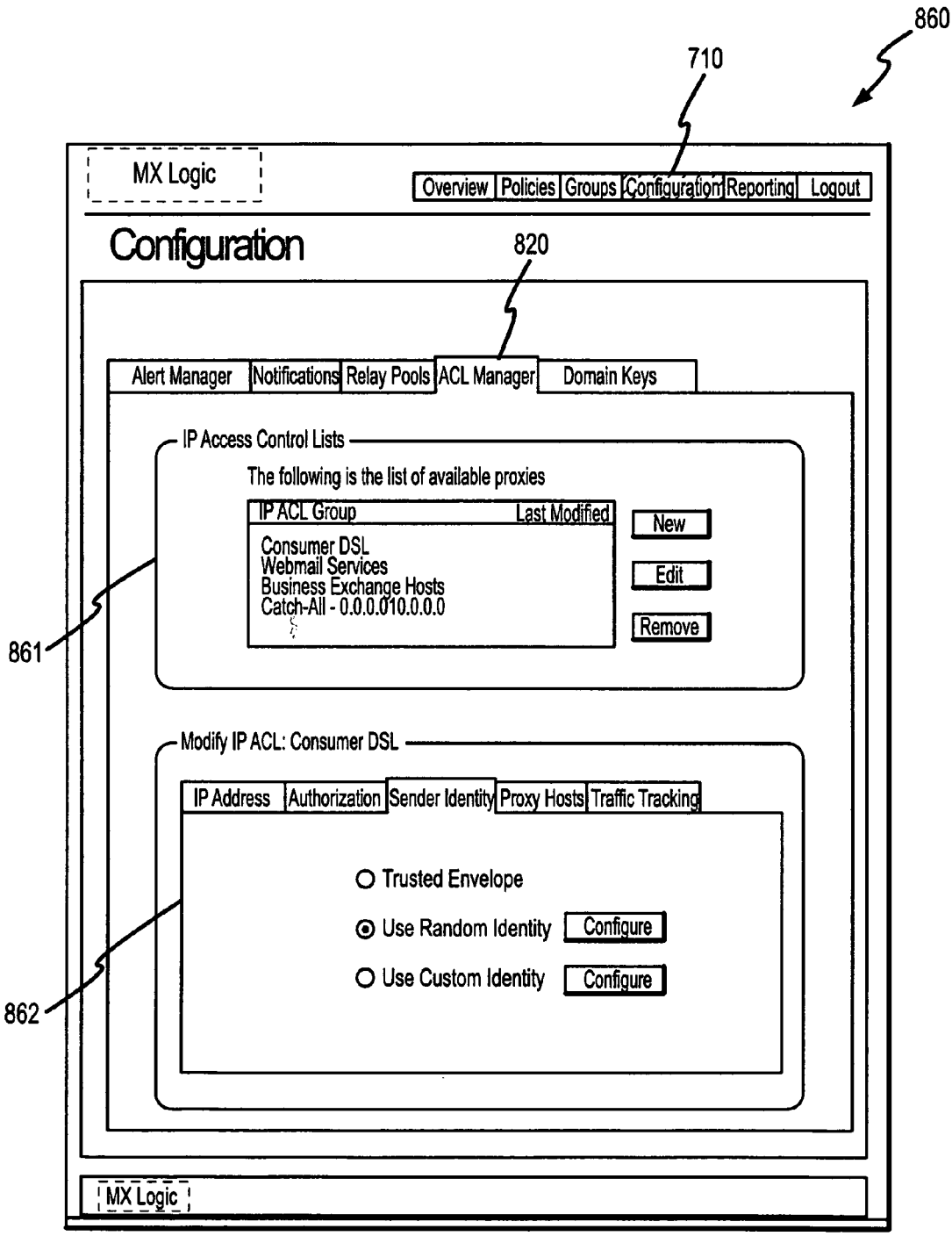
Figure 8E:
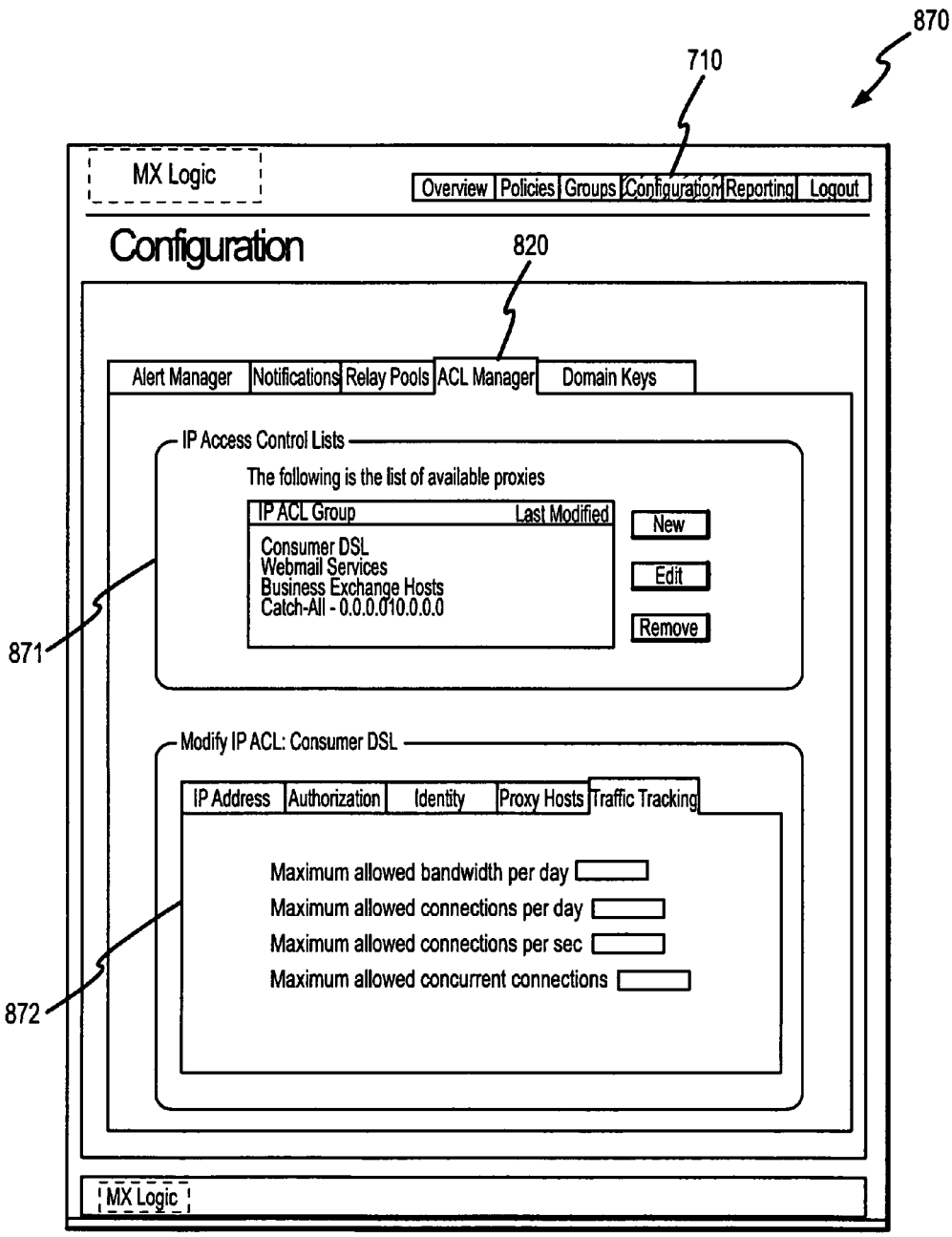
Figure 9A:
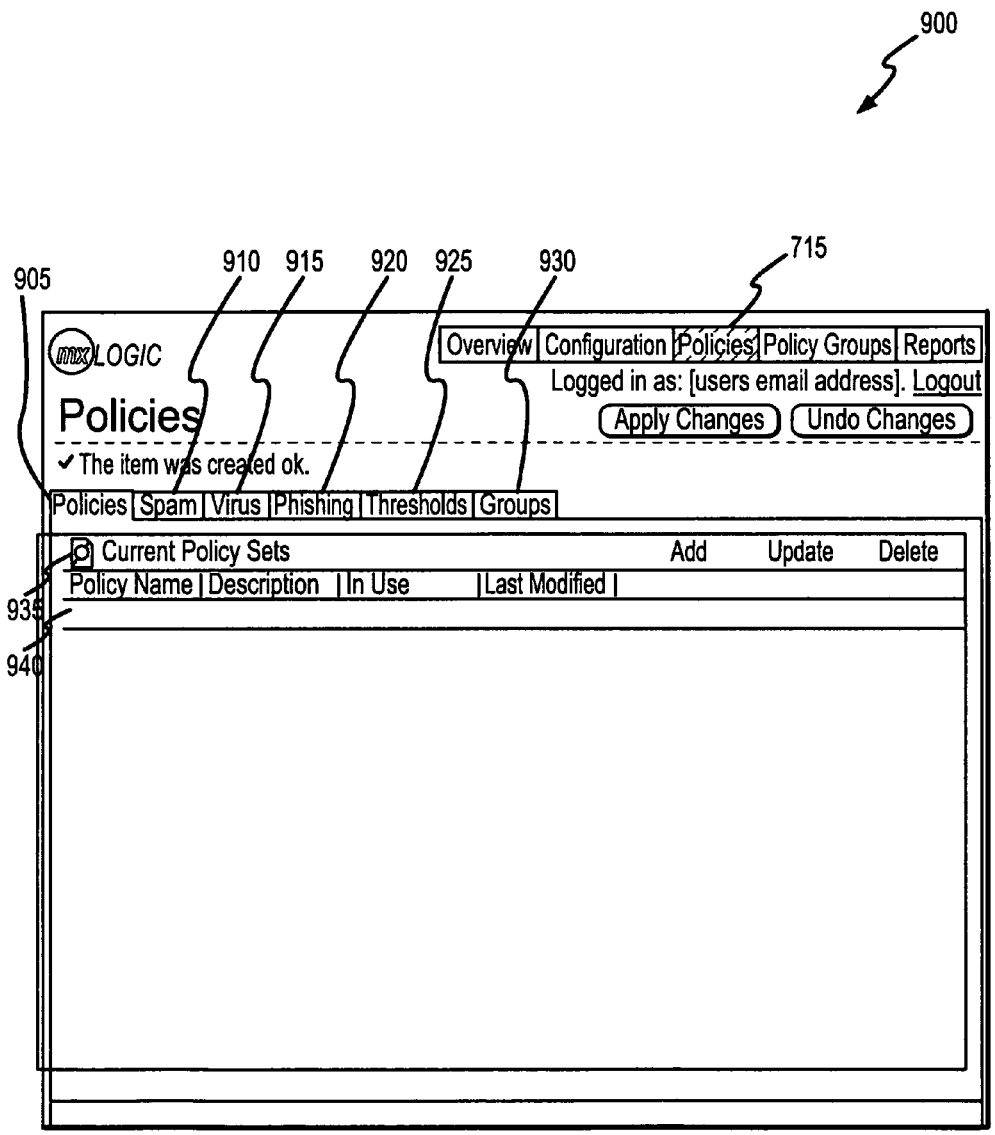
FIGS. 9A-F depict various exemplary policies UI screen shots in accordance with one embodiment of the present invention.
Figure 9B:
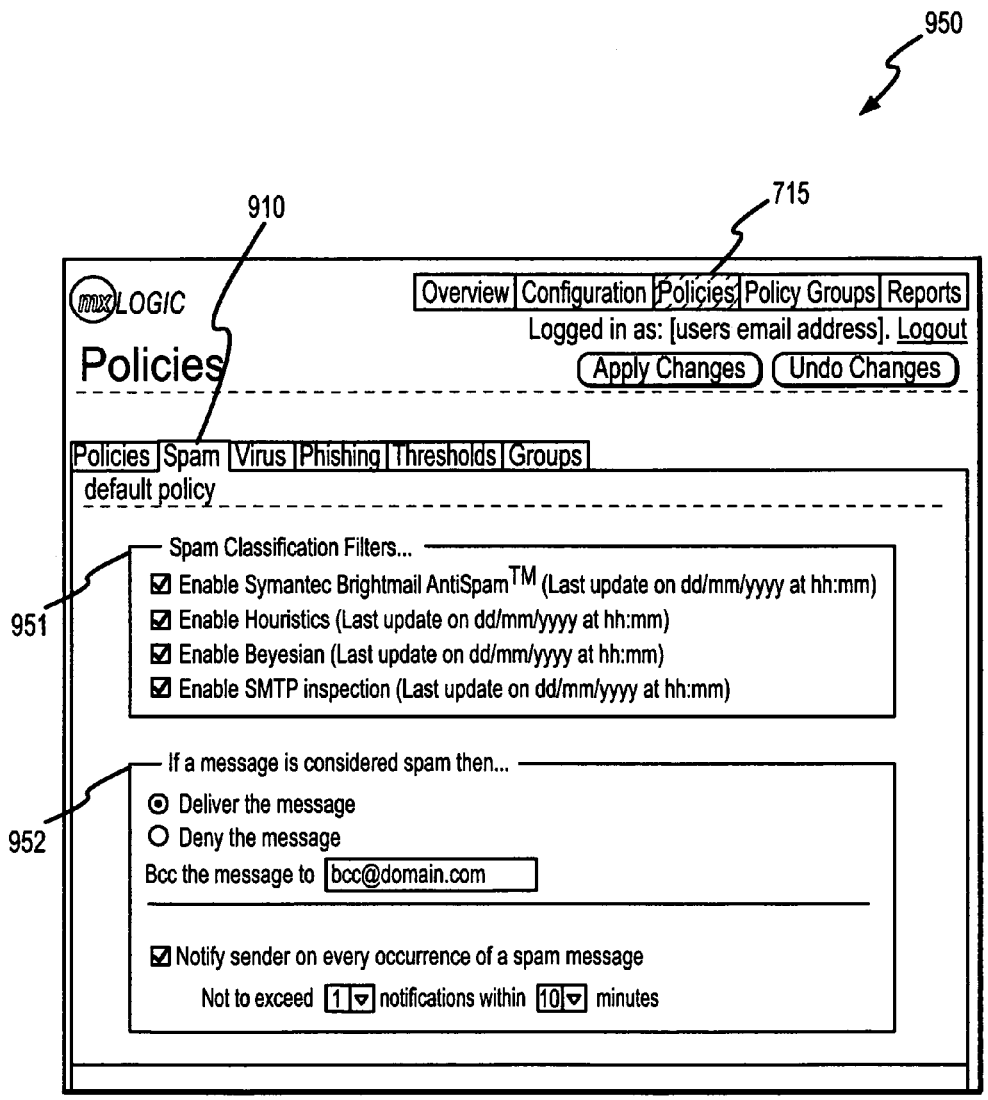
Figure 9C:
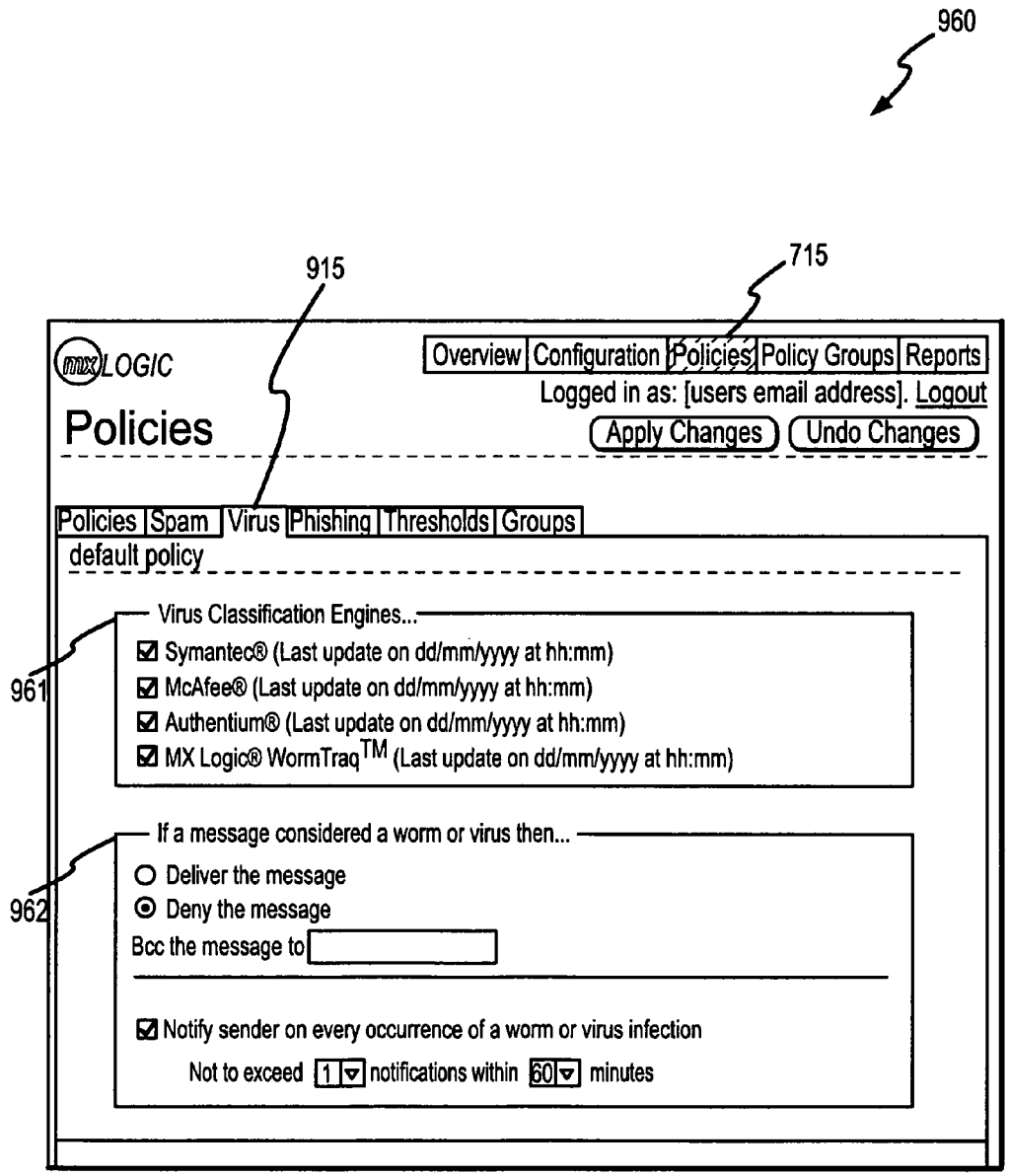
Figure 9D:
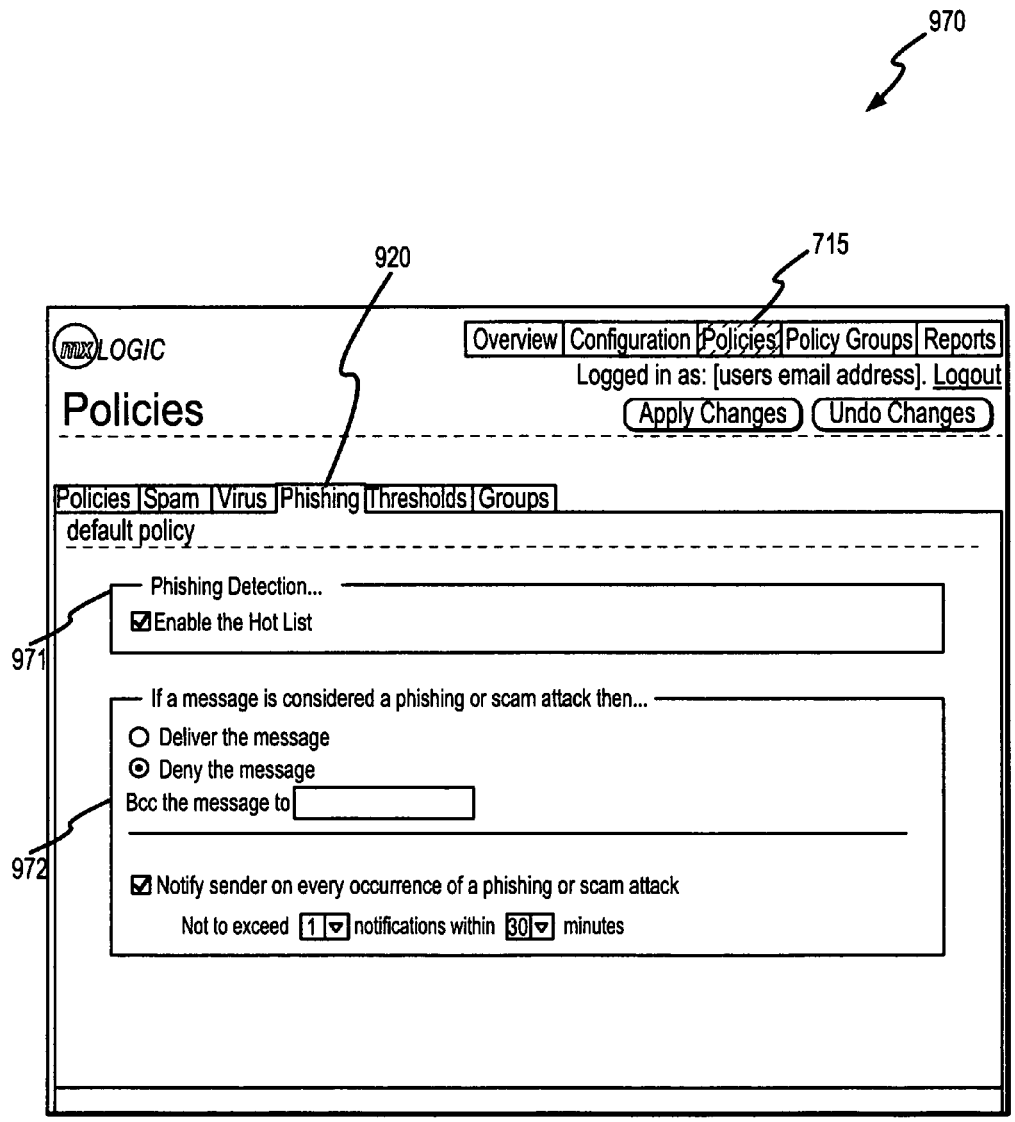
Figure 9E:
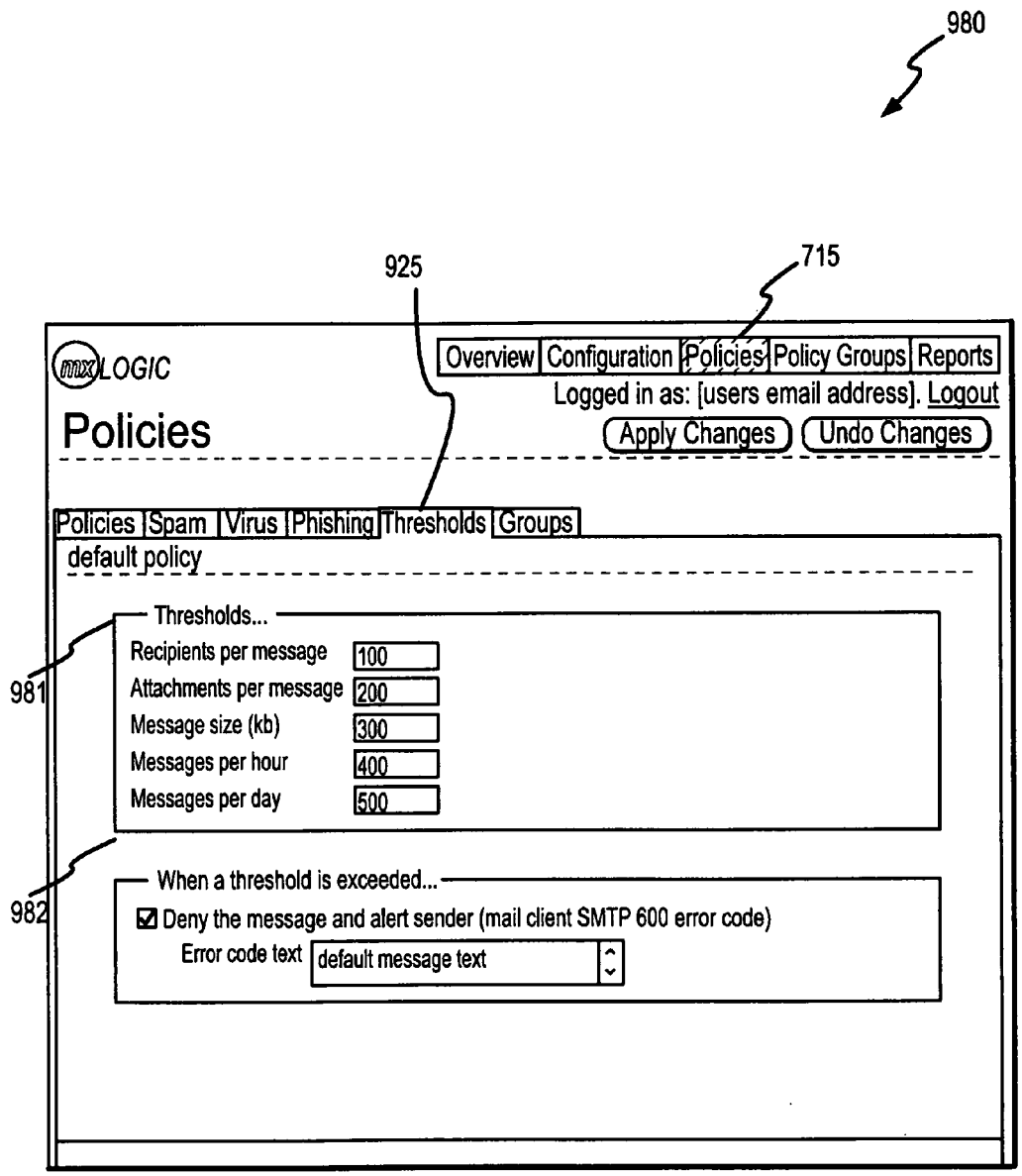
Figure 9F:
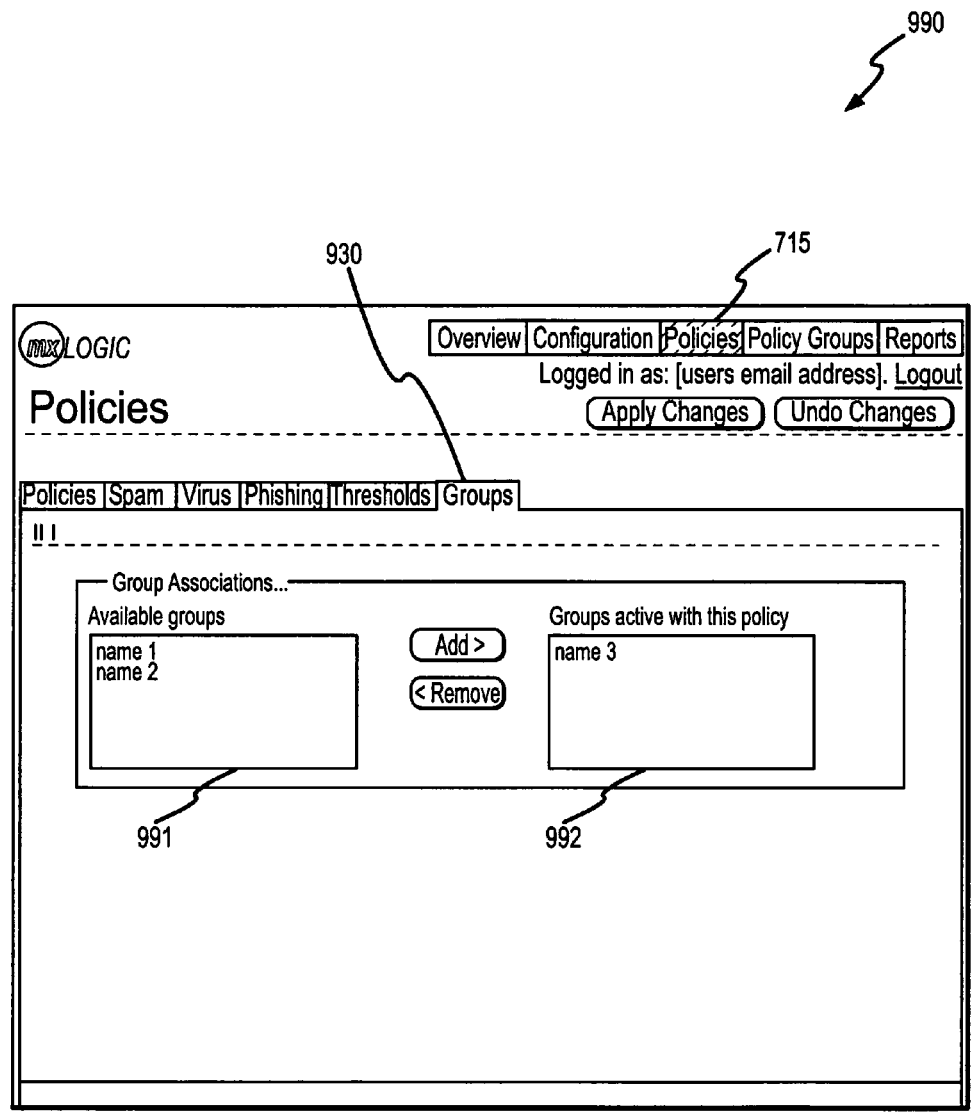
Figure 10A:
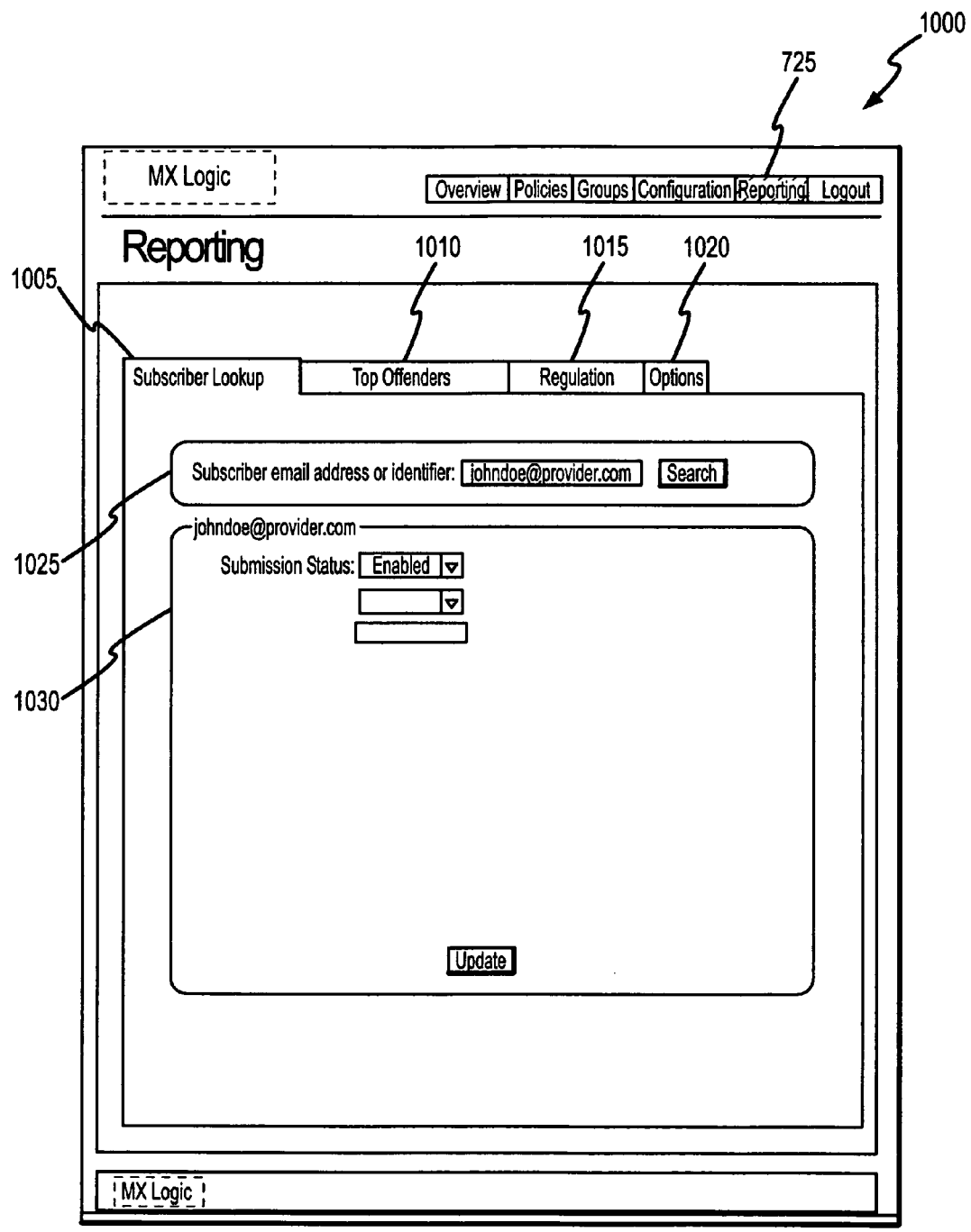
FIGS. 10A-C depict various exemplary reporting UI screen shots in accordance with one embodiment of the present invention.
Figure 10B:
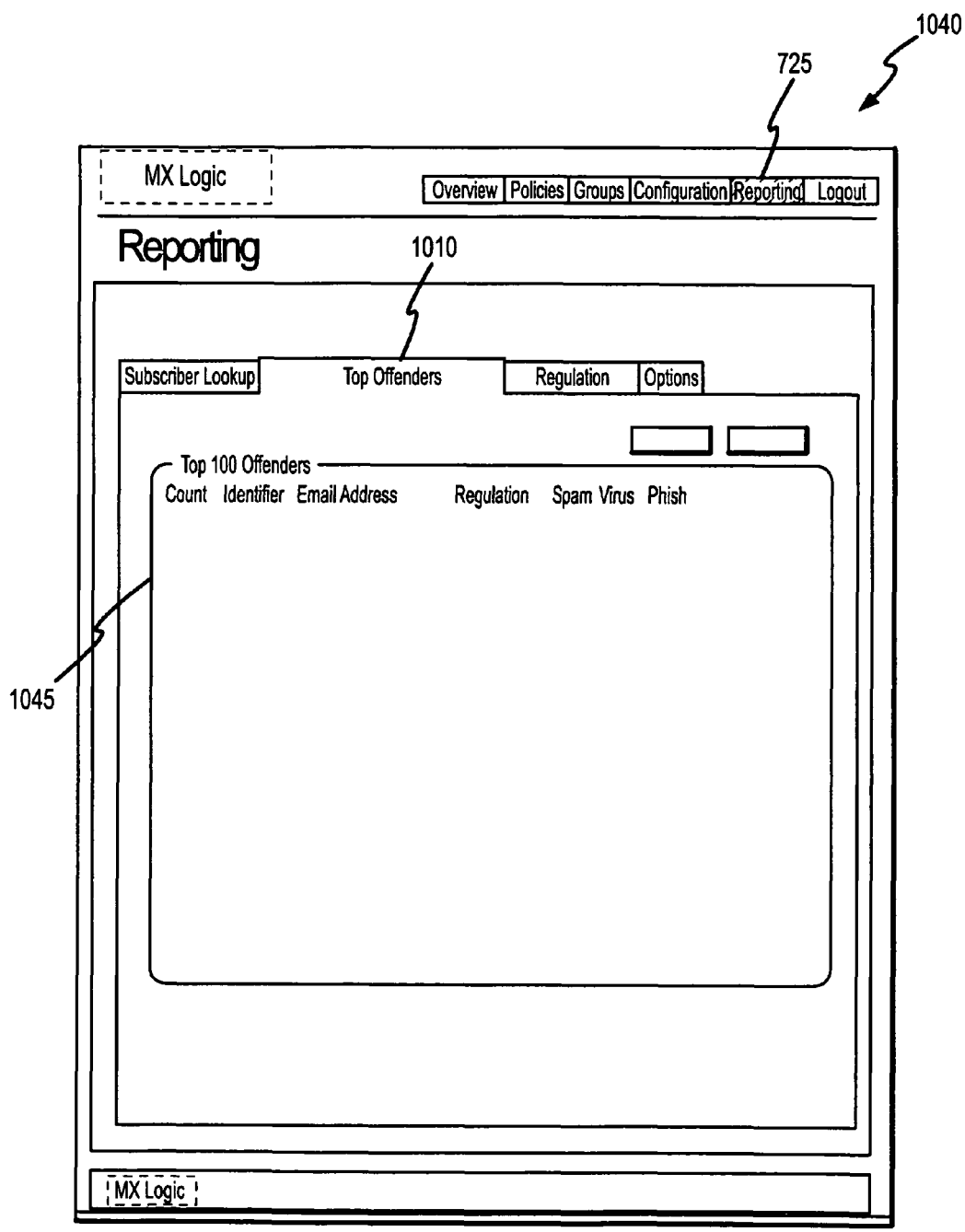
Figure 10C:
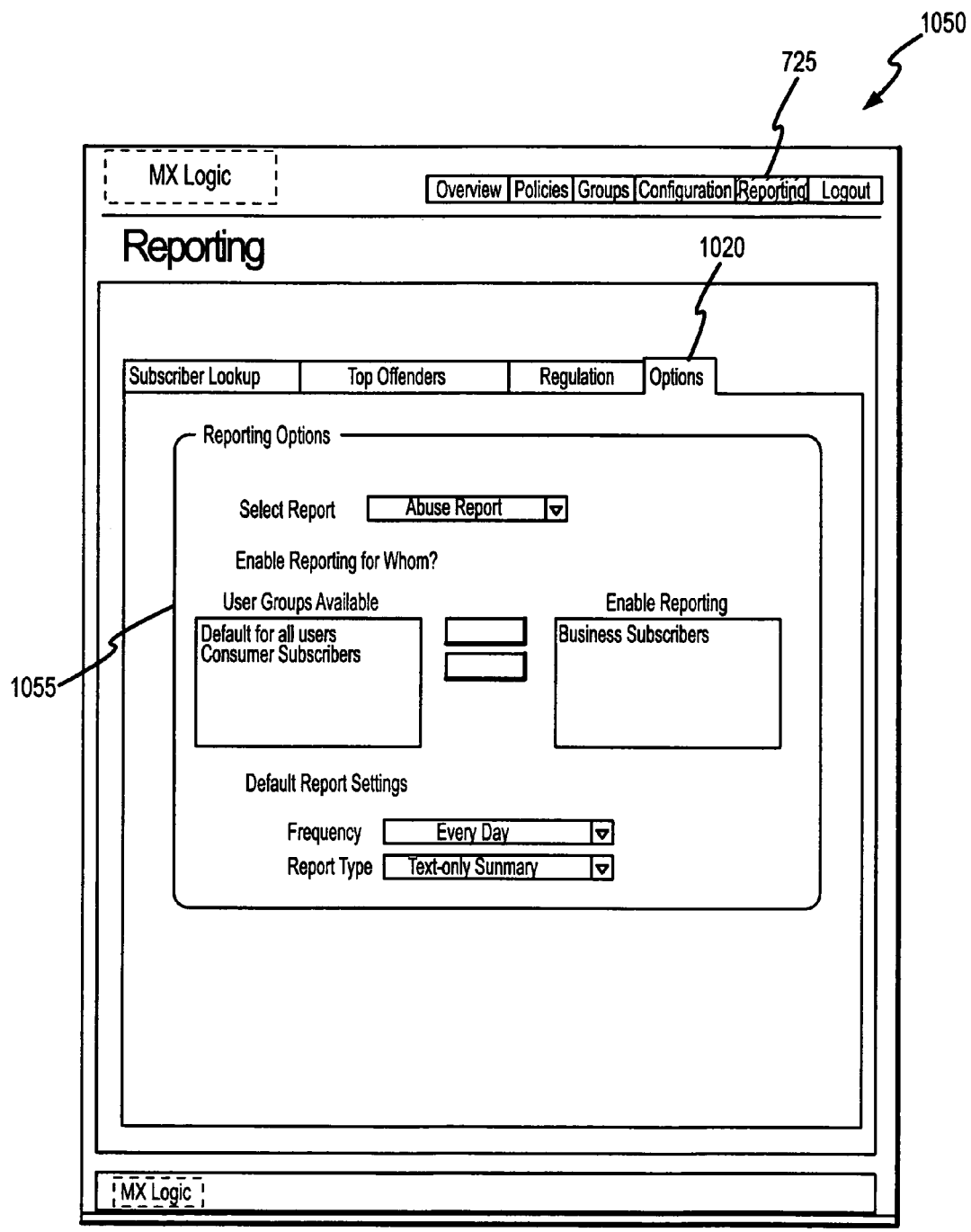

Embodiments of the present invention include various steps, which will be described in more detail below. A variety of these steps may be performed by hardware components or may be embodied in machine-executable instructions, which may be used to cause a general-purpose or special-purpose processor programmed with the instructions to perform the steps. Alternatively, the steps may be performed by a combination of hardware, software, and/or firmware. As such, FIG. 4 is an example of a computer system 400, such as a workstation, personal computer, client, server or gateway, upon which or with which embodiments of the present invention may be utilized.

According to the present example, the computer system includes a bus 401, at least one processor 402, at least one communication port 403, a main memory 404, a removable storage media 405 a read only memory 406, and a mass storage 407.

Processor(s) 402 can be any known processor, such as, but not limited to, an Intel® Itanium® or Itanium 2 processor(s), or AMD® Opteron® or Athlon MP® processor(s), or Motorola® lines of processors. Communication port(s) 403 can be any of an RS-232 port for use with a modem based dialup connection, a 10/100 Ethernet port, or a Gigabit port using copper or fiber. Communication port(s) 403 may be chosen depending on a network such a Local Area Network (LAN), Wide Area Network (WAN), or any network to which the computer system 400 connects.

Main memory 404 can be Random Access Memory (RAM), or any other dynamic storage device(s) commonly known in the art. Read only memory 406 can be any static storage device(s) such as Programmable Read Only Memory (PROM) chips for storing static information such as instructions for processor 402.

Mass storage 407 can be used to store information and instructions. For example, hard disks such as the Adaptec® family of SCSI drives, an optical disc, an array of disks such as RAID, such as the Adaptec family of RAID drives, or any other mass storage devices may be used.

Bus 401 communicatively couples processor(s) 402 with the other memory, storage and communication blocks. Bus 401 can be a PCI/PCI-X or SCSI based system bus depending on the storage devices used.

Removable storage media 405 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM).

The components described above are meant to exemplify some types of possibilities. In no way should the aforementioned examples limit the scope of the invention, as they are only exemplary embodiments.

In conclusion, embodiments of the present invention provide novel systems and methods for allowing subscriber message sending profiles to be maintained and used in conjunction with behavior-based anomaly detection techniques and traditional content-based filtering to enable application of appropriate message disposition policies to outbound subscriber traffic. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A computer-implemented method comprising:
   receiving messages originated by at least one subscriber account;
   evaluating the messages in order to develop a profile for the at least one subscriber account, wherein the profile includes information associated with content evaluation for the messages, and further includes metrics including a total number of e-mail messages originated from the at least one subscriber account within a predefined time interval, and an average number of recipients to which messages originated by the subscriber are addressed;
   generating behavior data for the at least one subscriber account to be included in the profile, wherein behavior data generated from a single e-mail message originated from the at least one subscriber account is combined with long-term behavior data in the profile to determine if the at least one subscriber account's privileges should be reduced;
   detecting behavior-based anomalies for the at least one subscriber account, wherein the behavior-based anomalies include attempting to communicate a large number of new e-mail messages in comparison to messaging patterns related to the behavior data being maintained in the profile, and include detecting an abnormal DNS query pattern; and
   determining reputation data for the at least one subscriber account based, at least in part, on the content evaluation and on said detected behavior-based anomalies, and wherein the behavior-based anomalies cause a blind carbon copy recipient to be added to the new email messages and, further, cause the new e-mail messages to be redirected to a destination for which they were not originally intended, and wherein a trustworthiness rating included in the profile is reduced as a result of detecting the behavior-based anomalies.

2. The method of claim 1, further comprising:
   providing an alert of potential subscriber account misuse based on said detected behavior-based anomalies.

3. The method of claim 1, further comprising:
   applying a predetermined set of message disposition policies to the new messages originated by said the subscriber account based on the reputation data.

4. The method of claim 1, further comprising:
   determining an immediate action with regard to a particular message originated by the subscriber account; and
   determining a long term action with regard to the subscriber account.

5. A gateway, comprising:
   at least one hardware processor;
   a service and response system that services and responds to requests from a subscriber account, wherein the gateway is configured for:
   receiving messages originated by the subscriber account;
   evaluating the messages in order to develop a profile for the subscriber account, wherein the profile includes information associated with content evaluation for the messages, and further includes metrics including a total number of e-mail messages originated from the subscriber account within a predefined time interval, and an average number of recipients to which messages originated by the subscriber are addressed;
   generating behavior data for the subscriber account to be included in the profile, wherein behavior data generated from a single e-mail message originated from the subscriber account is combined with long-term behavior data in the profile to determine if the subscriber account's privileges should be reduced;
   detecting behavior-based anomalies for the subscriber account, wherein the behavior-based anomalies include attempting to communicate a large number of new e-mail messages in comparison to messaging patterns related to the behavior data being maintained in the profile, and include detecting an abnormal DNS query pattern; and
   determining reputation data for the subscriber account based, at least in part, on the content evaluation and on said detected behavior-based anomalies, and wherein the behavior-based anomalies cause a blind carbon copy recipient to be added to the new email messages and, further, cause the new e-mail messages to be redirected to a destination for which they were not originally intended, and wherein a trustworthiness rating included in the profile is reduced as a result of detecting the behavior-based anomalies.

6. The gateway of claim 5, further comprising:
   an alert system that provides an alert of potential subscriber account misuse based on said detected behavior-based anomalies.

7. The gateway of claim 5, further comprising:
   a disposition policy system that applies a predetermined set of message disposition policies to the new messages originated by the subscriber account based upon said determined reputation data for the subscriber account.

8. The gateway of claim 5, wherein the gateway is further configured for:
   determining an immediate action with regard to a particular message originated by the subscriber account; and
   determining a long term action for the subscriber account.

9. A machine-readable non-transitory medium that stores instructions for a computer system to perform operations, comprising:
   receiving messages originated by at least one subscriber account;
   evaluating the messages in order to develop a profile for the at least one subscriber account, wherein the profile includes information associated with content evaluation for the messages, and further includes metrics including a total number of e-mail messages originated from the at least one subscriber account within a predefined time interval, and an average number of recipients to which messages originated by the at least one subscriber account are addressed;
   generating behavior data for the at least one subscriber account to be included in the profile, wherein behavior data generated from a single e-mail message originated from the at least one subscriber account is combined with long-term behavior data in the profile to determine if the at least one subscriber account's privileges should be reduced;
   detecting behavior-based anomalies for the at least one subscriber account, wherein the behavior-based anomalies include attempting to communicate a large number of new e-mail messages in comparison to messaging patterns related to the behavior data being maintained in the profile, and include detecting an abnormal DNS query pattern; and determining reputation data for the at least one subscriber account based, at least in part, on the content evaluation and on said detected behavior-based anomalies, and wherein the behavior-based anomalies cause a blind carbon copy recipient to be added to the new email messages and, further, cause the new e-mail messages to be redirected to a destination for which they were not originally intended, and wherein a trustworthiness rating included in the profile is reduced as a result of detecting the behavior-based anomalies.

10. The machine-readable medium of claim 9, wherein an alert is provided based on said detected behavior-based anomalies.

11. The machine-readable medium of claim 9, further comprising:

applying a predetermined set of message disposition policies to the new messages originated by the subscriber account based upon said determined reputation data for the subscriber account.

12. The machine-readable medium of claim 9, further comprising:

determining an immediate action with regard to a particular message originated by the subscriber account; and determining a long term action with regard to the subscriber account.

* * * * *